US011436789B2

(12) United States Patent
Joris et al.

(10) Patent No.: US 11,436,789 B2
(45) Date of Patent: Sep. 6, 2022

(54) SYSTEM FOR DETERMINING VISUALLY RELEVANT DESIGN DIFFERENCES BETWEEN 3D MODELS

(71) Applicant: TWIKIT NV, Berchem (BE)

(72) Inventors: Martijn Joris, Antwerp (BE); Olivier De Deken, Antwerp (BE)

(73) Assignee: TWIKIT NV, Berchem (BE)

( * ) Notice: Subject to any disclaimer, the term of this patent is extended or adjusted under 35 U.S.C. 154(b) by 0 days.

(21) Appl. No.: 17/291,501

(22) PCT Filed: Nov. 5, 2019

(86) PCT No.: PCT/EP2019/080266
§ 371 (c)(1),
(2) Date: May 5, 2021

(87) PCT Pub. No.: WO2020/094656
PCT Pub. Date: May 14, 2020

(65) Prior Publication Data
US 2022/0005260 A1   Jan. 6, 2022

(30) Foreign Application Priority Data

Nov. 5, 2018  (EP) ...................... 8204299

(51) Int. Cl.
*G06T 15/20* (2011.01)
*G06N 3/08* (2006.01)
(Continued)

(52) U.S. Cl.
CPC ............... *G06T 15/20* (2013.01); *G06N 3/08* (2013.01); *G06T 17/205* (2013.01); *G06T 19/20* (2013.01); *G06T 2219/2021* (2013.01)

(58) Field of Classification Search
None
See application file for complete search history.

(56) References Cited

U.S. PATENT DOCUMENTS 8,686,992 B1 * 4/2014 Makadia ............. G06V 20/653
345/422
9,734,579 B1 * 8/2017 Weill .................... G06T 7/344
(Continued)

FOREIGN PATENT DOCUMENTS

EP    3246851 A1    11/2017
EP    3275401 A1    1/2018

OTHER PUBLICATIONS

Peter Lindstrom, Greg Turk, "Image-Driven Simplification", Jul. 2000, ACM, ACM Transactions on Graphics, vol. 19, No. 3, pp. 204-241.*
(Continued)

*Primary Examiner* — Robert Bader
(74) *Attorney, Agent, or Firm* — Workman Nydegger

(57) ABSTRACT

A system involves determining visually relevant design differences between a first three-dimensional model and a second three-dimensional model. The system has: a model receiving unit configured to receive the first three-dimensional model and the second three-dimensional model; a viewpoint defining unit configured to define one or more viewpoints from which the first three-dimensional model and the second three-dimensional model can be viewed; and a difference determining unit configured to determine visually relevant design differences between the first three-dimensional model and the second three-dimensional model from the one or more viewpoints.

15 Claims, 9 Drawing Sheets

(51) Int. Cl.
*G06T 17/20* (2006.01)
*G06T 19/20* (2011.01)

(56) References Cited

U.S. PATENT DOCUMENTS

2017/0337733 A1* 11/2017 Georgescu ............... G06T 7/97
2018/0047208 A1   2/2018 Marin et al.

OTHER PUBLICATIONS

In Kyu Park, Kyoung Mu Lee, Sang Uk Lee, "Efficient Measurement of Shape Dissimilarity Between 3D Models Using Z-Buffer and Surface Roving Method", 2002, Hindawi, EURASIP Journal on Applied Signal Processing, pp. 1127-1134.*
International Search Report and Written Opinion from PCT Application No. PCT/EP2019/080266, dated Jan. 20, 2020.
Extended European Search Report from corresponding EP Application No. 18204299.4, dated Jul. 8, 2019.
Su et al., "Multi-view Convolutional Neural Networks for 3D Shape Recognition," 2015 IEEE International Conference on Computer Vision (ICCV), Dec. 7-13, 2015, pp. 945-953.

* cited by examiner

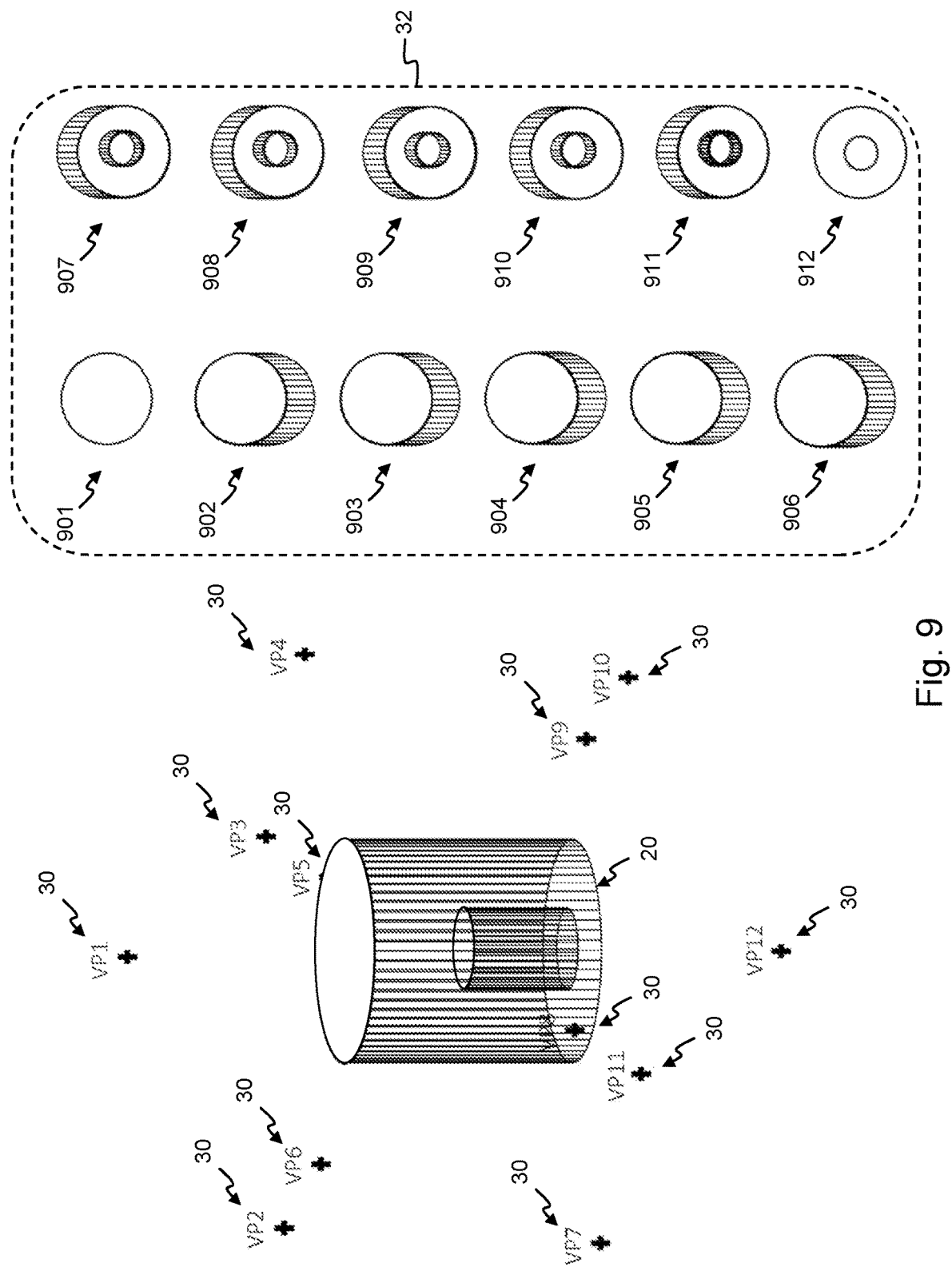

SYSTEM FOR DETERMINING VISUALLY RELEVANT DESIGN DIFFERENCES BETWEEN 3D MODELS

FIELD OF THE INVENTION

The present invention generally relates to the field of three-dimensional models, i.e. digital representations in a three-dimensional space. The present invention generally relates to the identification of visual differences between three-dimensional models, and more particularly to the determination of design features of three-dimensional models which are visually relevant in the context of 3D customization.

BACKGROUND OF THE INVENTION

3D Customization is when a customer designs, personalizes or customizes a product in a three-dimensional space, also referred to as 3D space. 3D Customization tools or processes are immediate mass customization tools that connect directly to digital manufacturing. These tools give real time feedback and interaction to the consumer and the product or service is changed according to the wishes of the consumer. By partaking in the design effort, the consumer has a higher feeling of endowment and a higher affect towards the object that they have helped to create. This object better fits their needs, tastes, desires or mood. The product can also be more functional by for example being customized to fit their body or to have an increase in functionality specific for that one customer.

Computer-aided design, also referred to as CAD, is the use of computer systems to aid in the creation, the modification, the analysis, and/or the optimization of a design. CAD may be used to design curves and figures in a two-dimensional space; or curves, surfaces, and models of structures in a three-dimensional space. The use of three-dimensional models, also referred to as 3D models, generated via CAD has improved the ability to design and build three-dimensional structures, for example in the worlds of engineering, mechanics, medicine, video games, movie industry, automotive, shipbuilding, aerospace industries, industrial and architectural design, prosthetics, and many more. CAD software is used to increase the productivity of a designer, improve the quality of design, improve communications through documentation, create a database for manufacturing, etc. CAD output is often in the form of electronic files comprising graphics showing the overall appearance of designed structures, and the files must convey information, such as design parameters of the three-dimensional structures, materials, processes, dimensions, and tolerances, according to application-specific conventions.

Most 3D model configurators run in the cloud and/or run on mobile devices, which can be cumbersome for designers and/or customers. Also, most existing solutions for CAD design create parametrized products which are commonly highly detailed and burdening in terms of memory, which makes them unsuited to be brought to the cloud. The improvement of the performance of CAD tools and of their usability remains a challenge nowadays.

Additionally, in manufacturing, digital has made inroads in how products are designed and how designs are shared inside companies and with the outside world. On a distributed platform, different designing teams may be working and improving different aspects of the design of a product and thereby creating for example new versions of the same 3D model of the product. In the context of a digital supply chain from customer to manufacturing for 3D customization, different customers may apply different design modifications to a 3D model made available for 3D customization by a designer.

One important aspect of the design is the ability for example to track changes applied to a 3D model, and/or for example to determine visual differences between one iteration of a 3D model and at least another iteration of the same 3D model, and/or for example to determine visual differences between 3D models of the same product, and/or to determine visual differences between 3D models of two different products, etc. This requires two or more 3D models to be compared, such that differences between the two or more 3D models can be identified, and/or such that differences between the 3D models can be accepted or rejected and then presented for viewing. The conventional method for accomplishing this task has been visual inspection. A designer for example attempts to visually match up two or more 3D models where they are similar. This visual inspection of two or more 3D models to identify where they are similar is complex, time consuming and unreliable.

Several methods exist to automate the comparison process of two or more 3D models via CAD tools. Such methods are for example described in EP3246851A1, EP3275401A1, US2018/047208A1 and the publication at the IEEE International Conference on Computer Vision of Su Hang et al. entitled "Multi-view Convolutional Neural Networks for 3D Shape Recognition" published on Dec. 7, 2015. One of the known methods for example relies on the comparison of the topological and geometrical structures of the two or more 3D models. Another known method is for example based on the systematic comparison of points of the two or more 3D models. Some of the methods require that the two or more 3D models are depicted in the same frame of reference and/or require that the two or more 3D models use the same geometric representation. For example, the methods to geometrically and topologically compare the two or more 3D models strictly require that two 3D models are depicted in the same frame of reference and use the same geometric representation. This lacks adaptability and flexibility, which renders the process cumbersome for the designer.

Other methods rely on the extraction of descriptors of two or more 3D models to compare the descriptors to each other. The calculation time and the processing power to extract the descriptors and to compare to each other are very high, and this process is not scalable to many 3D models.

Most of the methods relying on CAD tools that automate the comparison process between two or more 3D models compare all the differences between the two or more 3D models at 360 degrees in this reference frame. All the differences between the two or more 3D models will be detected as the 3D models are fully scanned at 360 degrees. This is a very complex and time consuming and power consuming process, especially when only a few characteristics of the 3D models are relevant to the designers.

SUMMARY OF THE INVENTION

It is an objective of the present invention to disclose a system that overcomes the above identified shortcomings of existing solutions. More particularly, it is an objective to disclose a system which determines visually relevant design differences between two or more three-dimensional models in a simple and efficient manner.

According to a first aspect of the present invention, the above defined objectives are realized by a system for determining visually relevant design differences between a first three-dimensional model and a second three-dimensional model, wherein the system comprises:
- a model receiving unit configured to receive the first three-dimensional model and the second three-dimensional model;
- a viewpoint defining unit configured to define one or more viewpoints from which one or more regions of interest of the first three-dimensional model and of the second three-dimensional model can be viewed; and
- a difference determining unit configured to determine visually relevant design differences between the first three-dimensional model and the second three-dimensional model from the one or more viewpoints and only in said regions of interest.

The system according to the present invention analyzes a first three-dimensional model and a second three-dimensional model from one or more points of view around respectively the first three-dimensional model and second three-dimensional model. In other words, the system according to the present invention does not need to analyze the first three-dimensional model or the second three-dimensional model entirely, in other words, the system according to the present invention does not need to analyze the first three-dimensional model or the second three-dimensional model at 360 degrees around respectively the first three-dimensional model and/or second three-dimensional model. On the contrary, the system according to the present invention identifies visually relevant design differences between the first three-dimensional model and the second three-dimensional model in one or more regions of interest of respectively the first three-dimensional model and/or of the second three-dimensional model, wherein the one or more regions of interest can be viewed from respectively one or more viewpoints. In other words, the system according to the present invention analyzes the first three-dimensional model in specific viewpoints for the first three-dimensional model and analyzes the second three-dimensional model in the same specific viewpoints for the second three-dimensional model, and the system according to the present invention therefore detects visually relevant design differences between two three-dimensional models in certain regions of interest of the models, while other regions of the three-dimensional models are not analyzed nor considered by the system according to the present invention for the determination of visually relevant design differences. This way, processing time and processing power are saved by the system according to the present invention when determining visually relevant design differences between two three-dimensional models. The determination of visually relevant design differences between two three-dimensional models is rendered simple and efficient. For example, visualization of the first three-dimensional model and the second three-dimensional model can then be displayed on a browser, which requires light implementation at the side of the designer and at the side of the customer of the design. In other words, the first three-dimensional model and the second three-dimensional model remain fixed with respect to the viewpoints. Neither the first three-dimensional model nor the second three-dimensional model is rotated partially or fully about each of one or a plurality of different axes independently when being viewed from the viewpoints.

In other words, a design difference between the first three-dimensional model and the second three-dimensional model is visually relevant when the design difference exceeds a predetermined tolerance, e.g. an allowable design difference, for a user of the system according to the present invention.

Additionally, the system according to the present invention allows creating configurators of 3D models which are automated, and which are located in the cloud, while keeping the complexity and the high level of details of the 3D models in the CAD tools. Customer choices can be extracted in as parameters out of the configurator to bring them back to CAD, eventually creating the production file ready for production at the CAD level.

As an example, the first three-dimensional model and the second three-dimensional model could be two different three-dimensional models of the same object, for example a phone case. A phone case comprises a front side, which can be customized by for example printing or engraving text and/or images, and wherein the front side for example comprises a through-opening for the phone camera such that pictures can still be taken even when the phone case is mounted on a phone. A phone case further comprises a back side which is adapted to be mounted on a corresponding phone. A designer of the phone case may want to prevent his customers from modifying the back of the phone case, such that the phone case always remains adaptable on the phone even though design modifications are being brought by a customer to the front side. The designer may then use the system according to the present invention to define one or more viewpoints of the phone case from which a customer may visualize the phone case, thereby restricting the regions of interest that the customers may modify during customization to for example the front of the phone case. The system according to the present invention further determine which of the design differences which can be brought to his design are visually relevant to his design. For example, certain design modifications of the front side of the phone case may result is a change of the shape of the corners of the front side of the phone case, changing them from round corners to rectangular corners. This difference does not affect the integrity nor the possible use of the phone case, and the system according to the present invention then determines that the design difference which exists between a first version of the three-dimensional model of the phone case with round corners and a second version of the three-dimensional model of the phone with rectangular corners is not a visually relevant design difference. For example, certain design modifications of the front side of the phone case may result in the disappearance of the through-opening for the camera, thereby rendering the three-dimensional model of the phone obsolete. The system according to the present invention then determines that the design difference which exists between a first version of the three-dimensional model of the phone case with a through-opening for the camera and a second version of the three-dimensional model of the phone without a through-opening for the camera is a visually relevant design difference.

As an example, the first three-dimensional model and the second three-dimensional model could be two different three-dimensional models of the same object or of parts of the same object. Alternatively, the first three-dimensional model and the second three-dimensional model could be two different three-dimensional models of two different objects. A design difference according to the present invention is a visually relevant design difference if and only if the design difference between the first three-dimensional model and the second three-dimensional model corresponds to an alteration of the first three-dimensional model or of the second three-dimensional model which is visually observable from a viewpoint defined by the viewpoint defining unit. A visually relevant design difference is understood in the context of the present invention is a design difference between the first three-dimensional model and the second three-dimensional model which can be determined by the difference determining unit and which for example is a design difference which is visually relevant according to a designer of the first three-dimensional model and/or according to the designer of the second three-dimensional model. In other words, the first three-dimensional model and the second three-dimensional model may differ by a plurality of design differences, but only one or more of these design differences may be a visually relevant design difference between the first three-dimensional model and the second three-dimensional model.

Three-dimensional models, also referred to as 3D models, represent a physical body using a collection of points in 3D space, connected by various geometric entities such as for example triangles, lines, curved surfaces, etc. 3D models are widely used anywhere in 3D graphics and CAD. A designer can then see a 3D model in various directions and views, also referred to as viewpoints. Viewpoints provide the conventions, rules, and languages for constructing, presenting and analyzing views of a 3D model. In ISO/IEC 42010: 2007 (IEEE-Std-1471-2000) a viewpoint is a specification for an individual view. An individual view is a representation of a whole system from the perspective of a viewpoint. In other words, the viewpoint defining unit according to the present invention defines individual views of the three-dimensional models, wherein an individual view is a representation of the whole three-dimensional model from the perspective of a viewpoint. Each viewpoint has a different focus, conceptualization, dedication and visualization of what the three-dimensional model is representing. In any given viewpoint, it is possible to make a three-dimensional model that contains only the objects that are visible from that viewpoint, but also captures all of the objects, relationships and constraints that are present and relevant to that viewpoint.

For example, when the first three-dimensional model and the second three-dimensional model are imported in a three-dimensional coordinate system (x;y;z), the one or more viewpoints could be defined with respect to this three-dimensional coordinate system. For example, the one or more viewpoints could be views of the first three-dimensional model and of the second three-dimensional model under an angle in the coordinate system. For example, the one or more viewpoints could be views of the first three-dimensional model and of the second three-dimensional model under a 0-degree angle with respect to x and y of the coordinate system. For example, the one or more viewpoints could be views of the first three-dimensional model and of the second three-dimensional model under a 90-degree angle with respect to y and z of the coordinate system. Alternatively, the one or more viewpoints could be views of the first three-dimensional model and of the second three-dimensional model under any angle in the coordinate system.

The viewpoint defining unit according to the present invention defines one or more viewpoints from which the first three-dimensional model can be viewed. The viewpoint defining unit according to the present invention additionally defines one or more viewpoints from which the second three-dimensional model can be viewed. Alternatively, the viewpoint defining unit according to the present invention defines one or more viewpoints from which both the first three-dimensional model and the second three-dimensional model can be viewed.

The one or more viewpoints are predefined by for example a designer of the first three-dimensional model and/or for example by a designer of the second three-dimensional model. In the context of the invention, a viewpoint is a fixed position in a 3D space, wherein a medium is located and through which one can observe the 3D space. This medium can be for example a human eye, a camera, a scanner, a computer-implemented standpoint in the three-dimensional analysis environment, etc. Alternatively, the 3D space can be the actual 3D space in which we live, or a computer-implemented digital 3D space. The position of the medium is predetermined by for example a designer of the first three-dimensional model and/or of the second three-dimensional model. The system according to the present invention then performs a sampling of the 3D space in function of predetermined sampling parameters such as for example an angle of view for the medium, an angle of view per axis in the 3D space, etc. The sampling of the 3D space can for example be uniform in the 3D space. Alternatively, the sampling can for example be a helix spiraling around the 3D model, thereby further minimizing the number of viewpoints necessary for analyzing the 3D model. Alternatively, the sampling may be a random sampling of the 3D space. The sampling determines the positions of the viewpoints for the system according to the present invention. In other words, the viewpoint defining unit defines one or more viewpoints in the 3D space at the positions in the 3D space generated when performing the sampling of the 3D space. In the context of the invention, there can be one viewpoint defined. Alternatively, there can be a plurality of viewpoints defined, for example tens of viewpoints, hundreds of viewpoints, thousands of viewpoints, etc. The viewpoint defining unit is alternatively configured to receive one or more viewpoints from which the first three-dimensional model and the second three-dimensional model can be viewed from for example a viewpoints database, wherein the viewpoints database comprises one or more predetermined viewpoints from which each of the three-dimensional models may be viewed.

In the context of the present invention, a region of interest in a three-dimensional model corresponds to the vertices of the three-dimensional model which are visible from a given viewpoint. In other words, all the vertices of a mesh of a three-dimensional model which are visible from a viewpoint as defined above form a region of interest in the three-dimensional model visible from this viewpoint. In a preferred embodiment, a region of interest in the first three-dimensional model therefore exists for each viewpoint of the system and a region of interest in the second three-dimensional model therefore exists for each viewpoint of the system. To each viewpoint corresponds a region of interest in a three-dimensional model.

The first three-dimensional model is received in the system by the model receiving unit. The viewpoint defining unit then identifies regions of interest in the first three-dimensional model visible from the viewpoints. The second three-dimensional model is then received in the system by the model receiving unit such that the second three-dimensional model and the first three-dimensional model are aligned with respect to each other in the three-dimensional space. In other words, the second three-dimensional model is received in the system by the model receiving unit such that the second three-dimensional model would be superimposed or overlaid onto the first three-dimensional model if the first three-dimensional model were still present in the three-dimensional space. The viewpoint defining unit then identifies regions of interest in the second three-dimensional model visible from the viewpoints, wherein the viewpoints for identifying the regions of interest in the first three-dimensional model and the viewpoints for identifying the regions of interest in the second three-dimensional model are identical.

There is provided a system for determining visually relevant design differences between a first three-dimensional model and a second three-dimensional model, wherein the system comprises:
- a model receiving unit configured to receive the first three-dimensional model and the second three-dimensional model;
- a viewpoint defining unit configured to define one or more viewpoints from which the first three-dimensional model and the second three-dimensional model can be viewed; and
- a difference determining unit configured to determine visually relevant design differences between the first three-dimensional model and the second three-dimensional model from the one or more viewpoints.

According to an optional aspect of the invention, the system further comprises a rendering engine configured to render, from each of the one or more viewpoints, first images of the first three-dimensional model and second images of the second three-dimensional model; and wherein the difference determining unit is further configured to determine visually relevant differences between the first images and the second images, thereby determining the visually relevant design differences between the first three-dimensional model and the second three-dimensional model.

This way, the rendering engine renders from each of the viewpoints first images of the first three-dimensional model and also renders from the same the viewpoints second images of the second three-dimensional model. For each of the viewpoints, the difference determining unit then compares the respective second image to the respective first image. The difference determining unit analyzes the first image and the second image for each viewpoint and further identifies design differences which are visually observable between the second image and the first image for each viewpoint. When a design difference between the first image and the second image is determined, the difference determining unit thereby determines a visually relevant design difference between the first three-dimensional model and the second three-dimensional model.

The first images are for example two-dimensional images of the first three-dimensional model rendered from one or more viewpoints. The second images are for example two-dimensional images of the second three-dimensional model rendered from one or more viewpoints.

According to an optional aspect of the invention, the difference determining unit is configured to determine visually relevant design differences between the first three-dimensional model and the second three-dimensional model from the first images and the second images rendered only from the one or more viewpoints.

This way, the system allows analyzing a first three-dimensional model and a second three-dimensional model by looking at the first three-dimensional model and at the second three-dimensional model only from one or more points of view around respectively the first three-dimensional model and second three-dimensional model. In other words, the system according to the present invention does not need to analyze the first three-dimensional model or the second three-dimensional model entirely, in other words, the system according to the present invention does not need to analyze the first three-dimensional model or the second three-dimensional model at 360 degrees around respectively the first three-dimensional model and/or second three-dimensional model. On the contrary, the system identifies visually relevant design differences between the first three-dimensional model and the second three-dimensional model only in one or more regions of interest of respectively the first three-dimensional model and/or of the second three-dimensional model, wherein the one or more regions of interest can be viewed from respectively one or more viewpoints. In other words, the system analyzes the first three-dimensional model only in specific viewpoints for the first three-dimensional model and analyzes the second three-dimensional model only in the same specific viewpoints for the second three-dimensional model, and the system according to the present invention therefore detects visually relevant design differences between two three-dimensional models only in certain regions of interest of the models, while other regions of the three-dimensional models are not analyzed nor considered by the system for the determination of visually relevant design differences. This way, processing time and processing power are saved by the system when determining visually relevant design differences between two three-dimensional models. The determination of visually relevant design differences between two three-dimensional models is rendered simple and efficient.

According to an optional aspect of the invention, the viewpoint defining unit is further configured to define:
- one or more regions of interest visible from the one or more viewpoints in the first three-dimensional model and in the second three-dimensional model;
- an allowable design difference between the first three-dimensional model and the second three-dimensional model for each of the regions of interest;

and wherein the difference determining unit is further configured to:
- determine over each of the regions of interest and only from the one or more viewpoints, a distance between the first three-dimensional model and the second three-dimensional model;
- determine a surface area for each of the regions of interest over which the distance between the first three-dimensional model and the second three-dimensional model is null; and
- for each of the regions of interest:
  - combine the distances from the viewpoints, thereby generating for each region of interest an accumulated distance between the first three-dimensional model and the second three-dimensional model;
  - weigh the accumulated distance by the surface area, thereby generating a measured design difference; and
  - determine visually relevant design differences between the first three-dimensional model and the second three-dimensional model from the one or more viewpoints when the measured design difference exceeds the allowable design difference.

The viewpoint defining unit is configured to define regions of interest visible only from the one or more viewpoints in the first three-dimensional model and in the second three-dimensional model. In other words, the viewpoint defining unit defines a three-dimensional analysis environment, wherein the three-dimensional analysis environment comprises:
- the one or more viewpoints from which the first three-dimensional model and the second three-dimensional model can be viewed, thereby defining regions of interest visible from the one or more viewpoints in the first three-dimensional model and in the second three-dimensional model; and an allowable design difference between the first three-dimensional model and the second three-dimensional model for each of the regions of interest.

The three-dimensional analysis environment for example further comprises lighting conditions under which both the first three-dimensional model and the second three-dimensional model are visible within the three-dimensional environment. The one or more viewpoints defined by the viewpoint design unit are fixed viewpoints from which the first three-dimensional model and/or the second three-dimensional model can be viewed within the three-dimensional analysis environment. In the context of thee invention, a viewpoint is a fixed position in a 3D space, e.g. in the three-dimensional analysis environment, wherein a medium is located and through which one can observe the 3D space. This medium can be for example a human eye, a camera, a scanner, a computer-implemented standpoint in the three-dimensional analysis environment, etc. Alternatively, the 3D space can be the actual 3D space in which we live, or a computer-implemented digital 3D space.

The distance and/or the surface area can for example be measured by units of visual representation, such as for example pixels. Alternatively, the distance and/or the surface area can be measured in the metric system. The allowable design difference for example corresponds to the minimal difference which is allowable by a user of the system. This allowable design difference is dictated by tolerances which are acceptable for a user of the system. For example, the allowable design difference may be in the range of micrometers between a first three-dimensional model and a second three-dimensional model. The allowable design difference may be in the range of centimeters or meters between another first three-dimensional model and second three-dimensional model. For each three-dimensional model, a surface area for each of the regions of interest over which the distance between the first three-dimensional model and the second three-dimensional model is null is determined. In other words, for each three-dimensional model, a surface area for each of the regions of interest over which the first three-dimensional model and the second three-dimensional model are identical is determined. This surface area wherein the first three-dimensional model and the second three-dimensional model correspond to each other is used to weigh the accumulated distance generated by combining the distance from the viewpoints.

The viewpoints are fixed within the three-dimensional analysis environment. Additionally, the first three-dimensional model is fixed with respect to the viewpoints and the second three-dimensional model is fixed with respect to the viewpoints. In other words, the difference determining unit determines visually relevant design differences while the first three-dimensional model and the second three-dimensional model remain fixed with respect to the viewpoints. In other words, neither the first three-dimensional model nor the second three-dimensional model is rotated partially or fully about each of one or a plurality of different axes independently. The difference determining unit analyses the differences between the first three-dimensional model and the second three-dimensional model when analyzing regions of interests visible in the first three-dimensional model and the second three-dimensional model only from the viewpoints without requiring any rotation or modification of the first three-dimensional model or the second three-dimensional model.

The first three-dimensional model is received in the system by the model receiving unit. In other words, the first three-dimensional model is received in the three-dimensional analysis environment. The rendering engine then renders first images of the first three-dimensional model from one or more viewpoints defined by the viewpoint defining unit in the three-dimensional analysis environment. The first three-dimensional model is then removed from the three-dimensional analysis environment. The second three-dimensional model is then received in the system by the model receiving unit such that the second three-dimensional model and the first three-dimensional model are aligned with respect to each other in the three-dimensional analysis environment. In other words, the second three-dimensional model is received in the system by the model receiving unit such that the second three-dimensional model would be superimposed onto the first three-dimensional model if the first three-dimensional model were still present in the three-dimensional analysis environment. In other words, the second three-dimensional model is received in the system by the model receiving unit such that the second three-dimensional model and the first three-dimensional model would be overlaid if the first three-dimensional model were still present in the three-dimensional analysis environment. The second three-dimensional model is therefore consecutively received in the three-dimensional analysis environment. The rendering engine then renders second images of the second three-dimensional model from one or more viewpoints defined by the viewpoint defining unit in the three-dimensional analysis environment, wherein the viewpoints for rendering the first images and the viewpoints for rendering the second images are identical. Alternatively, the second three-dimensional model is loaded first into the three-dimensional analysis environment and the first three-dimensional model is loaded consequently to the second three-dimensional model in the three-dimensional analysis environment.

The distance between the first three-dimensional model and the second three-dimensional model can be interpreted as for example the distance measured by the difference determining unit within the three-dimensional analysis environment between the first three-dimensional model and the second three-dimensional model. For example, the distance between the first three-dimensional model and the second three-dimensional model determined from a viewpoint is the distance between a vertex of the first three-dimensional model and the surface of the second three-dimensional model. Alternatively, the distance between the first three-dimensional model and the second three-dimensional model determined from a viewpoint is the distance between a vertex of the second three-dimensional model and the surface of the first three-dimensional model. Alternatively, the distance between the first three-dimensional model and the second three-dimensional model is measured by the difference determining unit as the difference between a distance in the three-dimensional analysis environment between the surface of the first three-dimensional model and a viewpoint and the distance in the three-dimensional analysis environment between the surface of the second three-dimensional model and the same viewpoint.

According to an optional aspect of the invention, the difference determining unit is further configured to superimpose the first images and the second images and to determine, when superimposing the first images and the second images, a distance between the first three-dimensional model and the second three-dimensional model.

In this case, the distance between the first three-dimensional model and the second three-dimensional model is determined by the difference determining unit as the distance between a point of a first image and the corresponding point of the corresponding second image. In other words, a second image is overlaid or superimposed on the corresponding first image and a distance between a point of the second image and the corresponding point on the first image is measured by the difference determining unit.

According to an optional aspect of the invention, the first three-dimensional model is a three-dimensional reference model and wherein the system further comprises:
 a design modification receiving unit configured to receive a set of design modifications wherein each of the design modifications may be applied on the three-dimensional reference model; and
 a modifying unit configured to apply one or more of the design modifications on the three-dimensional reference model, thereby generating three-dimensional modified models, each comprising design differences with respect to the three-dimensional reference model; wherein the design differences result from the design modifications.

According to an optional aspect of the invention, the first three-dimensional model is a three-dimensional reference model and wherein the system further comprises:
 a design modification receiving unit configured to receive a set of design modifications, wherein a design modification corresponds to a geometric manipulation altering a three-dimensional model to which the geometric manipulation is applied and wherein each of the design modifications may be applied on the three-dimensional reference model; and
 a modifying unit configured to apply one or more of the design modifications on the three-dimensional reference model, thereby generating three-dimensional modified models, each comprising design differences with respect to the three-dimensional reference model; wherein the design differences result from the design modifications.

This way, for each design modification applied by the modifying unit to the three-dimensional reference model, the difference determining unit determines visually relevant design difference between each of the three-dimensional modified models and the three-dimensional reference model. In other words, each of the three-dimensional modified models comprises design differences with respect to the three-dimensional reference model and the difference determining unit is configured to determine from all the three-dimensional modified models which of these design differences are visually relevant design differences.

The design modifications are inputted in the system. Alternatively, the design modifications are received from a neural network. A design modification corresponds to a geometric manipulation altering a three-dimensional model to which the geometric manipulation is applied. Each of the design modifications may be applied on the three-dimensional reference model. For example, on a parametric three-dimensional model, a design modification is configured to change the value of a parameter of the parametric three-dimensional model. For example, on a three-dimensional mesh, a design modification is configured to change the position of one or more vertices of the three-dimensional mesh.

According to an optional aspect of the invention, the second three-dimensional model corresponds to one of the three-dimensional modified models.

This way, the second three-dimensional model corresponds to a modified version of the first three-dimensional model. Indeed, the first three-dimensional model is three-dimensional reference model to which one or more design modifications are applied, thereby generating a three-dimensional modified model for each design modification which is applied. Each three-dimensional modified model therefore differs from the three-dimensional reference model in that the design of the three-dimensional reference model has been modified by the design modification. Each of the design modification generates a visually relevant design difference between a three-dimensional modified model and the three-dimensional reference model when the design modification is applied onto the three-dimensional reference model. In other words, in this case, the second three-dimensional model differs from the first three-dimensional model by at least one visually relevant design difference.

According to an optional aspect of the invention, the system further comprises a reference model generating engine configured to generate the three-dimensional reference model from reference design parameters.

The first three-dimensional model and the second three-dimensional model comprise for example parametric CAD files which each comprise the design of a three-dimensional object. For example, the first three-dimensional model comprises a first CAD file which comprise the design of a first three-dimensional object and the second three-dimensional model comprises a second CAD file which comprise the design of a second three-dimensional object, wherein the second three-dimensional object is different from the first three-dimensional object.

A visually relevant reference design parameter of the three-dimensional reference model is a reference design parameter which is visually relevant to the three-dimensional reference model if and only if an alteration or modification of this reference design parameter generates a change of the three-dimensional reference model which is visually observable from one or more of the viewpoints for the three-dimensional reference model.

According to an optional aspect of the invention, each of the design modifications corresponds to a modification of a reference design parameter of the three-dimensional reference model, and wherein each of the design modifications comprises:
 a modification range of design parameter values along which the reference design parameter may be modified;
 a modification step size according to which the reference design parameter may be modified in the modification range of design parameters values.

According to an optional aspect of the invention, the three-dimensional reference model is a parametric three-dimensional model and the system further comprises a reference model generating engine configured to generate the three-dimensional reference model from design parameters and wherein each of the design modifications corresponds to a modification of a design parameter of the three-dimensional reference model, and wherein each of the design modifications comprises:
 a modification range of design parameter values along which the design parameter may be modified;
 a modification step size according to which the design parameter may be modified in the modification range of design parameters values.

In this case, a design modification corresponds to an alteration of one or more of the reference design parameters of the three-dimensional reference model, also known as design parameters of the three-dimensional reference model. This way, the system is configured to analyze whether a modification of a reference design parameter generates or causes a change to the three-dimensional reference model which is visually relevant for the three-dimensional reference model. For example, it is possible that a design modification of one or more of the reference design parameters causes a change or alteration to the three-dimensional reference model, but that the change caused to the three-dimensional reference model is not visually detectable or observable from the one or more viewpoints by the system. The system then does not determine the design modification as visually relevant and the design difference detected between the three-dimensional modified model and the three-dimensional reference model, wherein the design difference results from the application of this design modification to the three-dimensional reference model, is not identified as visually relevant.

Parametric modelling uses the computer to design objects or systems that model component features with real world behavior. Parametric models use feature-based, solid and surface modelling design tools to manipulate the system features. One of the most important aspect of parametric modelling is that features that are interlinked automatically change. In other words, parametric modelling allows the designer to define entire classes of shapes, not just specific instances. With parametric modelling, the designer need only alter one parameter; the other interlinked parameters get adjusted automatically.

A modification range of design parameter values comprises a range of possible values to which a reference design parameter may be changed. For example, if a reference design parameter is equal to 1 cm, a modification range of the reference design parameter could be from 0.5 cm to 3.5 cm. Alternatively, for example, if a reference design parameter is equal to 100 cm, a modification range of the reference design parameter could be from 10 cm to 500 cm. Alternatively, for example, if a reference design parameter is equal to 10 cm, a modification range of the reference design parameter could be from 9.99 cm to 10.09 cm. A modification step size comprises a step size of design parameter values with which a reference design parameter may be changed. For example, if a reference design parameter is equal to 1 cm, a modification step size of the reference design parameter could be 0.5 cm, thereby allowing the reference design parameter to be changed by steps of 0.5 cm. Alternatively, for example, if a reference design parameter is equal to 100 cm, a modification step size of the reference design parameter could be 10 cm, thereby allowing the reference design parameter to be changed by steps of 10 cm. Alternatively, for example, if a reference design parameter is equal to 10 cm, a modification step size of the reference design parameter could be 0.005 cm, thereby allowing the reference design parameter to be changed by steps of 0.005 cm.

The modification range and/or the modification step size are inputted by a designer of the three-dimensional reference model and/or a designer of the three-dimensional modified model. Alternatively, the modification range and/or the modification step size may be retrieved from a database comprised in the system.

According to an optional aspect of the invention, for each of the design modifications, the modifying unit is configured to generate three-dimensional modified models for each design parameter value along the modification range and with the modification step size of each of the design parameter.

This way, the system is configured to analyze whether a modification of a reference design parameter generates or causes a change to the three-dimensional reference model which is visually relevant for the three-dimensional reference model. In other words, the system is configured to scan the modification range of a reference design parameter with the modification step size and the system is further configured to generate a three-dimensional modified model for each parameter value of the modification range and with the modification step size, thereby generating a plurality of three-dimensional modified models wherein each of the three-dimensional modified model differs from the three-dimensional reference model via the one or more respective design modifications that were applied to the three-dimensional reference model. It is possible that the design modification of a reference design parameter of the three-dimensional reference causes a change or alteration to the three-dimensional reference model, but that the change caused to the three-dimensional reference model is not visually detectable or observable from the one or more viewpoints by the system. The system then does not determine the design modification corresponding to the particular parameter value as visually relevant and the design difference detected between the three-dimensional modified model and the three-dimensional reference model, wherein the design difference results from the application of this design modification to the three-dimensional reference model, is not identified as visually relevant.

According to an optional aspect of the invention, the system further comprises a reference mesh generating engine configured to generate a reference mesh for the three-dimensional reference model, wherein the reference mesh comprises a reference number of vertices and a reference position of each of the vertices.

According to an optional aspect of the invention, the three-dimensional reference model is represented by a mesh representation, wherein the mesh representation comprises a reference number of vertices and a reference position of each of the vertices.

Alternatively, in this case, the first three-dimensional model and the second three-dimensional model comprise for example mesh files from which each a three-dimensional object may be reconstructed. For example, the first three-dimensional model comprises a first mesh file which comprise the mesh representative for a first three-dimensional object and the second three-dimensional model comprises a second mesh file mesh representative for a second three-dimensional object, wherein the second three-dimensional object is different from the first three-dimensional object.

A visually relevant reference mesh of the three-dimensional reference model is a reference mesh which is visually relevant to the three-dimensional reference model if and only if an alteration or modification of this reference mesh generates a change of the three-dimensional reference model which is visually observable from one or more of the viewpoints for the three-dimensional reference model.

According to an optional aspect of the invention, each of the design modifications corresponds to a modification of the reference number of vertices and/or of the reference position of each of the vertices of the three-dimensional reference model, and wherein each of the design modifications comprises:
 a modified number of vertices; and/or
 a modified position of each of the vertices.

According to an optional aspect of the invention, for each of the design modification, the modifying unit is configured to generate three-dimensional modified models for each modified number of vertices and with the modified positions of each of the vertices.

According to an optional aspect of the invention, for each of the design modification, the modifying unit is configured to generate three-dimensional modified meshes for the three-dimensional modified models, wherein said three-dimensional modified meshes comprise the modified number of vertices and with the modified positions of each of the vertices.

A modified number of vertices comprises a possible number of vertices which may be comprised in a three-dimensional modified model. A modified position of each of the vertices comprises a position for each of the vertices in a three-dimensional modified model. In other words, in this case, each three-dimensional modified model differs from the three-dimensional reference model in the number of vertices and in the position of the vertices.

According to an optional aspect of the invention, the difference determining unit comprises a multiview recurrent neural network which comprises a convolution neural network in each timestep of the recurrent neural network.

A multiview recurrent neural network comprises a neural network configured to analyze a three-dimensional object by considering the three-dimensional object from a plurality of viewpoints and further configured to memorize the three-dimensional object from all the viewpoints. This way, the multiview recurrent neural network analyzes the entire three-dimensional object as visible from the viewpoints. A recurrent neural network is also known under RNN. A convolution neural network is also known under CNN.

According to an optional aspect of the invention, the first three-dimensional model comprises design features, and the system further comprises:
  a model library comprising a plurality of three-dimensional models, wherein each of the three-dimensional models comprises one or more learning design features;
  a relevance learning unit configured to receive, from said model library, one or more relevance criteria for the learning design features of the three-dimensional models of the model library;
  a design feature determining unit configured to determine the design features of the first three-dimensional model;
and the difference determining unit is further configured to determine that the design features of the first three-dimensional model are visually relevant design features of the first three-dimensional model when the design features correspond to one or more relevance criteria.

According to an optional aspect of the invention, the parametric three-dimensional model comprises design parameters, and the system further comprises:
  a model library comprising a plurality of parametric three-dimensional models, wherein each of the parametric three-dimensional models comprises one or more learning design parameters;
  a relevance learning unit configured to receive, from said model library, one or more relevance criteria for the learning design parameters of the three-dimensional models of the model library;
and the difference determining unit is further configured to determine that the design parameters of the first three-dimensional model are visually relevant design parameters of the parametric three-dimensional model when the design parameters correspond to one or more relevance criteria.

A design feature for example corresponds to a physical characteristic of the first three-dimensional model. In our previous example of the phone case, a design feature of a first three-dimensional model could be the through-opening for the camera of the phone case.

The relevance learning unit is configured to receive, from the model library, one or more relevance criteria for the learning design features of the three-dimensional models of the model library. In other words, the relevance learning unit learns to correctly assess the relevance criteria for the learning design features of the first three-dimensional model, which is not comprised in the model library, from the relevance criteria that the relevance learning unit learns from the learning design features of the three-dimensional models of the model library. The design feature determining unit is then configured to determine, based on the fully trained relevance learning unit, the relevance criteria for the design features of the first three-dimensional model. The difference determining unit then determines, from the relevance criteria for the design features of the first three-dimensional model, which of the design features of the first three-dimensional model are visually relevant design features of the first three-dimensional model, and therefore, which of the design features of the first three-dimensional model relate to visually relevant design differences.

In other words, each of the three-dimensional modified models comprises design differences with respect to the three-dimensional reference model and the difference determining unit is configured to determine from all the three-dimensional modified models which of these design differences are visually relevant design differences. The difference determining unit also determines from the relevance criteria for the design features of the first three-dimensional model, which design features of the first three-dimensional model correspond to the visually relevant design differences, thereby determining the visually relevant design features of the first three-dimensional model.

According to a second aspect of the invention, there is provided a computer-implemented method for determining design differences between a first three-dimensional model and a second three-dimensional model, wherein the method comprises the steps of:
  receiving said first three-dimensional model and said second three-dimensional model;
  defining one or more viewpoints from which one or more regions of interest of said first three-dimensional model and of said second three-dimensional model can be viewed; and
  determining visually relevant design differences between said first three-dimensional model and said second three-dimensional model from said one or more viewpoints and only in the regions of interest.

The computer-implemented method according to the present invention allows analyzing a first three-dimensional model and a second three-dimensional model by looking at the first three-dimensional model and at the second three-dimensional model from one or more points of view around respectively the first three-dimensional model and second three-dimensional model. In other words, the system according to the present invention does not need to analyze the first three-dimensional model or the second three-dimensional model entirely, in other words, the system according to the present invention does not need to analyze the first three-dimensional model or the second three-dimensional model at 360 degrees around respectively the first three-dimensional model and/or second three-dimensional model. On the contrary, the method according to the present invention identifies visually relevant design differences between the first three-dimensional model and the second three-dimensional model in one or more regions of interest of respectively the first three-dimensional model and/or of the second three-dimensional model, wherein the one or more regions of interest can be viewed from respectively one or more viewpoints. In other words, the method according to the present invention analyzes the first three-dimensional model in specific viewpoints for the first three-dimensional model and analyzes the second three-dimensional model in the same specific viewpoints for the second three-dimensional model, and the method according to the present invention therefore detects visually relevant design differences between two three-dimensional models in certain regions of interest of the models, while other regions of the three-dimensional models are not analyzed nor considered by the system according to the present invention for the determination of visually relevant design differences. This way, processing time and processing power are saved by the method according to the present invention when determining visually relevant design differences between two three-dimensional models. The determination of visually relevant design differences between two three-dimensional models is rendered simple and efficient.

There is provided a computer-implemented method for determining design differences between a first three-dimensional model and a second three-dimensional model, wherein the method comprises the steps of:

receiving said first three-dimensional model and said second three-dimensional model;

defining one or more viewpoints from which said first three-dimensional model and said second three-dimensional model can be viewed; and determining visually relevant design differences between said first three-dimensional model and said second three-dimensional model from said one or more viewpoints.

According to an optional aspect of the invention, the method further comprises the steps of defining a three-dimensional analysis environment, wherein the three-dimensional analysis environment comprises:

the one or more viewpoints from which the first three-dimensional model and the second three-dimensional model can be viewed, thereby defining one or more regions of interest visible from the one or more viewpoints in the first three-dimensional model and in the second three-dimensional model;

an allowable design difference between the first three-dimensional model and the second three-dimensional model for each of the regions of interest;

aligning the first three-dimensional model and the second three-dimensional model in the three-dimensional analysis environment;

determining, over each of the regions of interest and only from the one or more viewpoints, a distance between the first three-dimensional model and the second three-dimensional model;

determining a surface area for each of the regions of interest over which the distance between the first three-dimensional model and the second three-dimensional model is null;

for each of the regions of interest:

combining the distances from the viewpoints, thereby generating for each region of interest an accumulated distance between the first three-dimensional model and the second three-dimensional model;

weighing the accumulated distance by the surface area, thereby generating a measured design difference; and determining visually relevant design differences between the first three-dimensional model and the second three-dimensional model from the one or more viewpoints when the measured design difference exceeds the allowable design difference.

The current invention in addition also relates to a computer program comprising software code adapted to perform the method according to the present invention.

The invention further relates to a computer readable storage medium comprising the computer program according to the present invention.

The invention further relates to a computer readable storage medium comprising computer-executable instructions which, when executed by a computing system, perform the method according to the present invention.

BRIEF DESCRIPTION OF THE DRAWINGS

FIG. 9 schematically illustrates a second three-dimensional model and second images rendered from the viewpoints visible on FIG. 9.

DETAILED DESCRIPTION OF EMBODIMENT(S)

Figure 1:
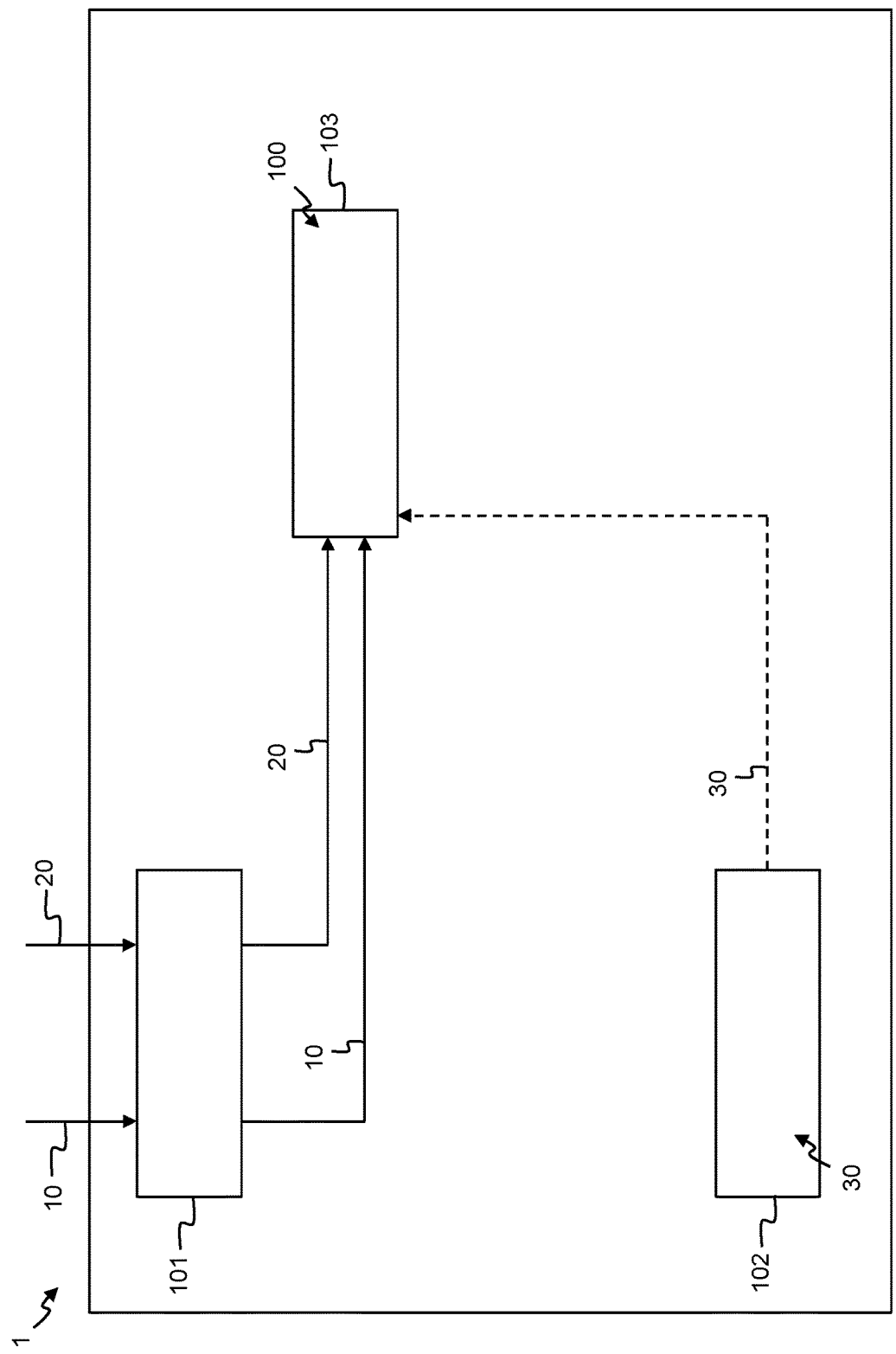
FIG. 1 schematically illustrates an embodiment of a system for determining visually relevant design differences between two three-dimensional models according to the present invention.

According to an embodiment shown in FIG. 1, a system 1 is for determining visually relevant design differences 100 between a first three-dimensional model 10 and a second three-dimensional model 20 is depicted. The system 1 comprises a model receiving unit 101, a viewpoint defining unit 102 and a difference determining unit 103. The model receiving unit 101 receives a first three-dimensional model 10 and a second three-dimensional model 20. The viewpoint defining unit 102 defines one or more viewpoints 30 from which the first three-dimensional model 10 and the second three-dimensional model 20 can be viewed. The difference determining unit 103 determines visually relevant design differences 100 between the first three-dimensional model 10 and the second three-dimensional model 20 from the one or more viewpoints 30. Preferably, the difference determining unit 103 determines visually relevant design differences 100 between the first three-dimensional model 10 and the second three-dimensional model 20 only from the viewpoints 30. In other words, the difference determining unit 103 determines visually relevant design differences 100 between the first three-dimensional model 10 and the second three-dimensional model 20 from first images 31 and second images 32 only rendered from one or more of the viewpoints 30.

Figure 2:
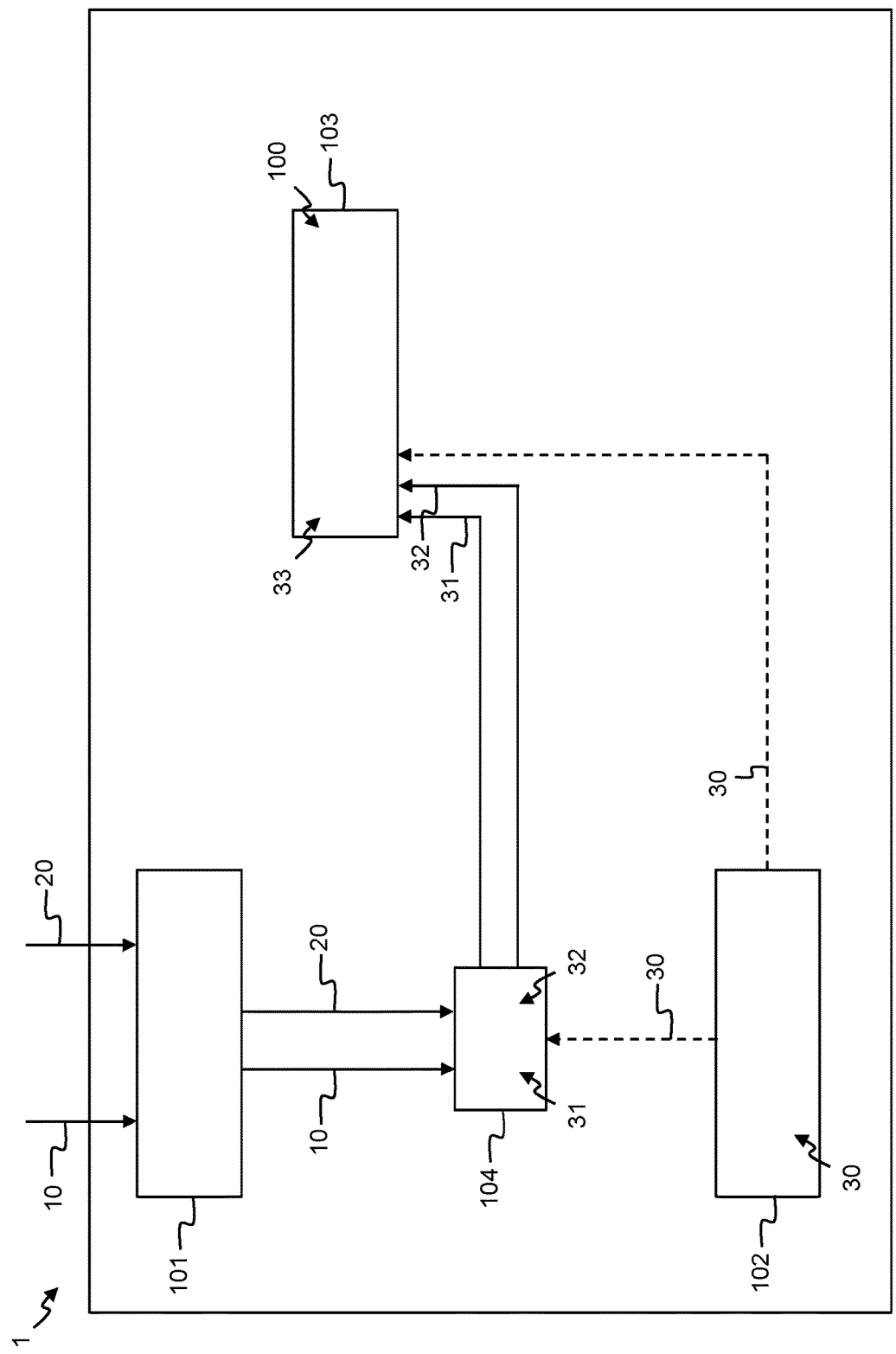
FIG. 2 schematically illustrates an embodiment of a system according the present invention wherein said system comprises a rendering engine.

According to an embodiment shown in FIG. 2, a system 1 is for determining visually relevant design differences 100 between a first three-dimensional model 10 and a second three-dimensional model 20 is depicted. The system 1 comprises a model receiving unit 101, a viewpoint defining unit 102, a difference determining unit 103 and a rendering engine 104. The model receiving unit 101 receives a first three-dimensional model 10 and a second three-dimensional model 20. The viewpoint defining unit 102 defines one or more viewpoints 30 from which the first three-dimensional model 10 and the second three-dimensional model 20 can be viewed. The difference determining unit 103 determines visually relevant design differences 100 between the first three-dimensional model 10 and the second three-dimensional model 20 from the one or more viewpoints 30. The rendering engine 104 renders, from each of the one or more viewpoints 30, first images 31 of the first three-dimensional model 10 and second images 32 of the second three-dimensional model 20. The difference determining unit 103 further determines visually relevant differences 33 between the first images 31 and the second images 32, thereby determining the visually relevant design differences between the first three-dimensional model 10 and the second three-dimensional model 20. Preferably, the difference determining unit 103 determines visually relevant design differences 100 between the first three-dimensional model 10 and the second three-dimensional model 20 only from the viewpoints 30. In other words, the difference determining unit 103 determines visually relevant design differences 100 between the first three-dimensional model 10 and the second three-dimensional model 20 from first images 31 and second images 32 only rendered from one or more of the viewpoints 30.

Figure 3:
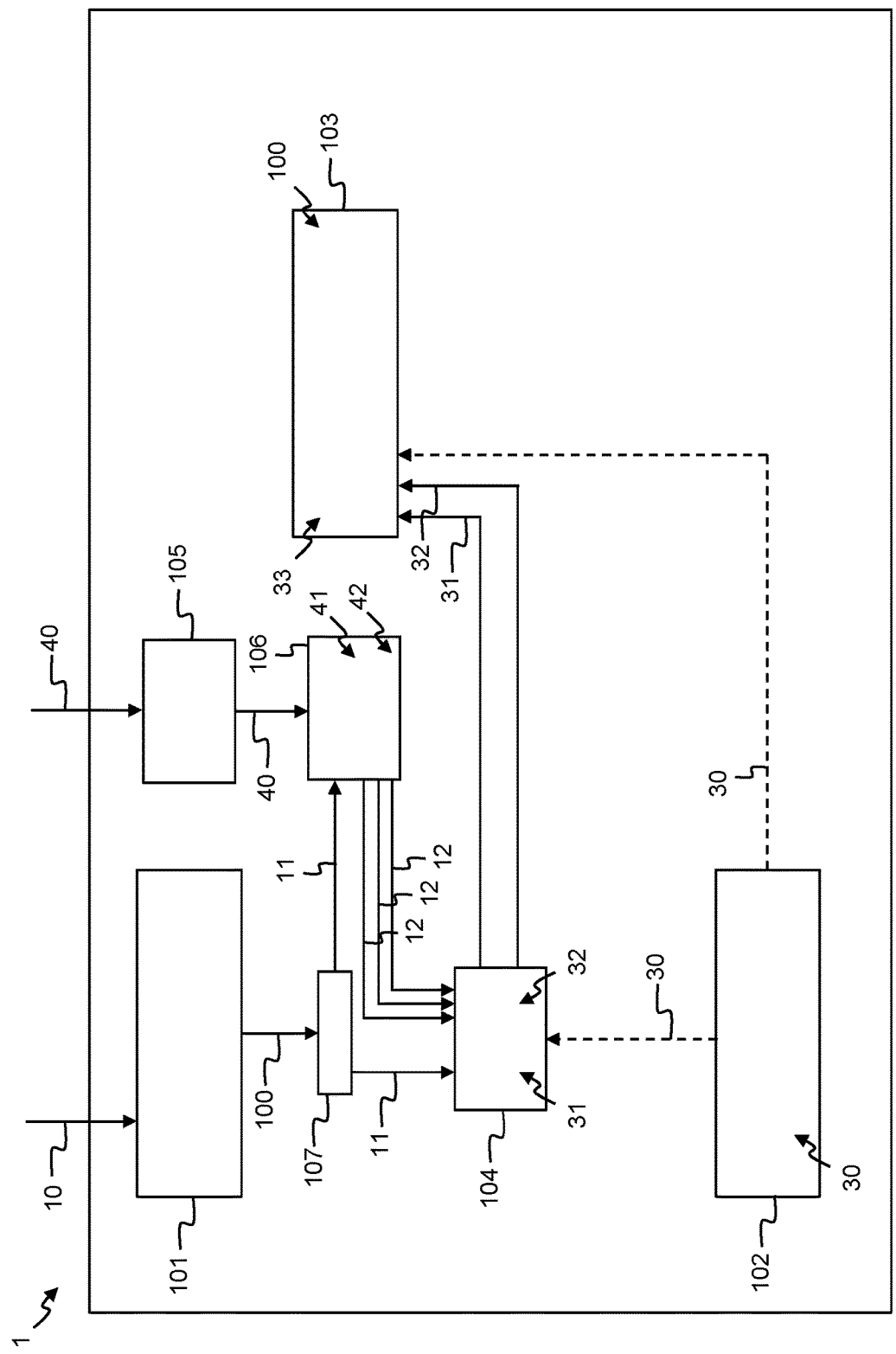
FIG. 3 schematically illustrates an embodiment of a system according the present invention wherein said system determines visually relevant design differences between two parametric three-dimensional models.

According to an embodiment shown in FIG. 3, a system 1 is for determining visually relevant design differences 100 between a first three-dimensional model 10 and a second three-dimensional model 20 is depicted. The system 1 comprises a model receiving unit 101, a viewpoint defining unit 102, a difference determining unit 103, a rendering engine 104, a design modification receiving unit 105, a modifying unit 106 and a reference model generating engine 107. The model receiving unit 101 receives a first three-dimensional model 10 and a second three-dimensional model 20. The viewpoint defining unit 102 defines one or more viewpoints 30 from which the first three-dimensional model 10 and the second three-dimensional model 20 can be viewed. The difference determining unit 103 determines visually relevant design differences 100 between the first three-dimensional model 10 and the second three-dimensional model 20 from the one or more viewpoints 30. The rendering engine 104 renders, from each of the one or more viewpoints 30, first images 31 of the first three-dimensional model 10 and second images 32 of the second three-dimensional model 20. The difference determining unit 103 further determines visually relevant differences 33 between the first images 31 and the second images 32, thereby determining the visually relevant design differences between the first three-dimensional model 10 and the second three-dimensional model 20. Preferably, the difference determining unit 103 determines visually relevant design differences 100 between the first three-dimensional model 10 and the second three-dimensional model 20 only from the viewpoints 30. In other words, the difference determining unit 103 determines visually relevant design differences 100 between the first three-dimensional model 10 and the second three-dimensional model 20 from first images 31 and second images 32 only rendered from one or more of the viewpoints 30. The first three-dimensional model 10 is for example a three-dimensional reference model 11. The first three-dimensional model 10 comprises reference design parameters 110 which are received by the model receiving unit 101. The reference model generating engine 107 receives the reference design parameters 110 from the model receiving unit 101, and the reference model generating engine 107 generates the three-dimensional reference model 11 from the reference design parameters 110. The design modification receiving unit 105 receives one or more design modifications 40 wherein each of the design modifications 40 may be applied on the three-dimensional reference model 11. The visually relevant design differences 100 result from the design modifications 40. For example, the one or more design modifications 40 are inputted in the system 1. According to an alternative embodiment, the one or more design modifications 40 may be retrieved from for example a database of the system 1. Each of the design modifications 40 corresponds to a modification of a reference design parameter 110 of the three-dimensional reference model 11. Each of the design modifications 40 comprises a modification range 41 of design parameter values of one of the reference design parameters 110 along which this reference design parameter 110 may be modified. Each of the design modifications 40 further comprises a modification step size 42 of design parameter values for one of the reference design parameters 110 according to which this reference design parameter 110 may be modified in the modification range 41 of the reference design parameter 110. The design modifications 40 are for example predetermined for a three-dimensional model 10;11;20. The modifying unit 106 applies one or more of the design modifications 40 on the three-dimensional reference model 11, thereby generating one or more three-dimensional models 12. For each of the design modifications 40, the modifying unit 106 generates three-dimensional models 12 for each design parameter value of the reference design parameters 110 along the modification range 41 and with the modification step size 42 of each of the reference design parameters 110. For example, in FIG. 3, the design modification receiving unit 105 receives one design modification 40. The design modification 40 comprises 3 design parameter values of a reference design parameter 110 of the three-dimensional reference model 11, and the design modification 40 further comprises a modification step size of 1 of the reference design parameter 110 along the modification range 42 for the reference design parameter 110. The modifying unit 106 therefore generates three-dimensional modified models 12 for each design parameter value along the modification range 41 and with the modification step size 42 of the reference design parameter 110 of the three-dimensional reference model 11. The second three-dimensional model 20 corresponds to one of the three-dimensional modified models 12 and the difference determining unit 103 determines visually relevant design differences between the first three-dimensional model 10, i.e. the three-dimensional reference model 11, and each of the second three-dimensional model 20, wherein the second three-dimensional model 20 each time corresponds to one or the 3 three-dimensional modified models 12 generated by the modifying unit 106. More particularly, the rendering engine 104 receives the three-dimensional reference model 11 and receives one of the 3 three-dimensional modified models 12 and the rendering engine 104 renders first images 31 of the three-dimensional reference model 11 for one or more of the viewpoints 30 and second images 32 of one of the 3 three-dimensional modified models 12 for one or more of the viewpoints 30. The difference determining unit 33 receives the first images 31 and the second images 32 from the rendering engine 104 and the difference determining unit 33 determines visually relevant differences 33 between the first images 31 of the three-dimensional reference model 11 for one or more of the viewpoints 30 and second images 32 of one of the 3 three-dimensional modified models 12 for one or more of the viewpoints 30. The rendering engine 104 then receives the three-dimensional reference model 11 and receives another one of the 3 three-dimensional modified models 12 and the rendering engine 104 renders first images 31 of the three-dimensional reference model 11 for one or more of the viewpoints 30 and second images 32 of another one of the 3 three-dimensional modified models 12 for one or more of the viewpoints 30. The difference determining unit 33 receives the first images 31 and the second images 32 from the rendering engine 104 and the difference determining unit 33 determines visually relevant differences 33 between the first images 31 of the three-dimensional reference model 11 for one or more of the viewpoints 30 and second images 32 of another one of the 3 three-dimensional modified models 12 for one or more of the viewpoints 30. The operation is repeated for all the three-dimensional modified models 12 generated by the modifying unit 106.

Figure 4:
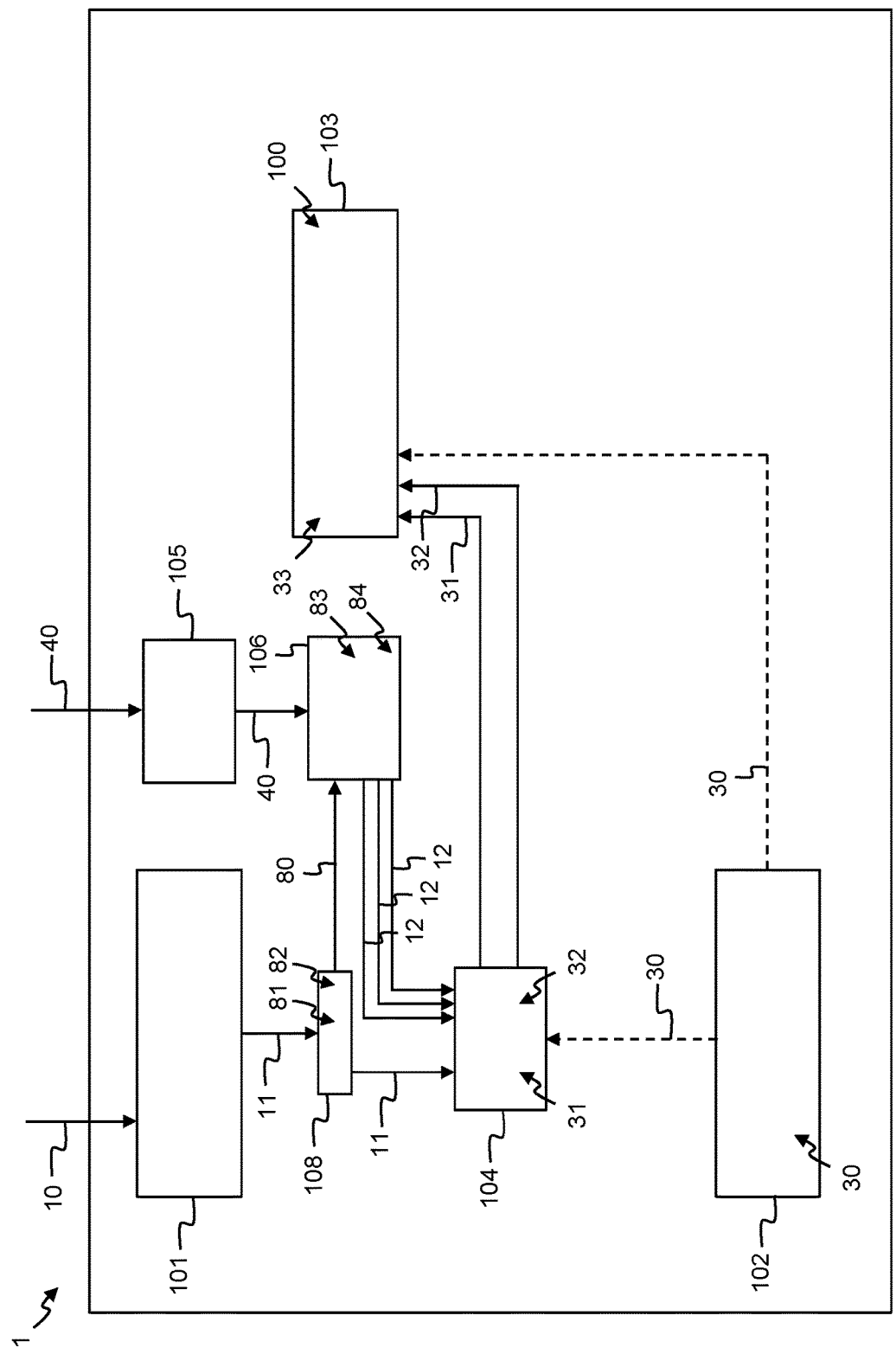
FIG. 4 schematically illustrates an embodiment of a system according the present invention wherein said system determines visually relevant design differences between two three-dimensional models with different meshes.

According to an embodiment shown in FIG. 4, a system 1 is for determining visually relevant design differences 100 between a first three-dimensional model 10 and a second three-dimensional model 20 is depicted. The system 1 comprises a model receiving unit 101, a viewpoint defining unit 102, a difference determining unit 103, a rendering engine 104, a design modification receiving unit 105, a modifying unit 106 and a reference mesh generating engine 108. The model receiving unit 101 receives a first three-dimensional model 10 and a second three-dimensional model 20. The viewpoint defining unit 102 defines one or more viewpoints 30 from which the first three-dimensional model 10 and the second three-dimensional model 20 can be viewed. The difference determining unit 103 determines visually relevant design differences 100 between the first three-dimensional model 10 and the second three-dimensional model 20 from the one or more viewpoints 30. The rendering engine 104 renders, from each of the one or more viewpoints 30, first images 31 of the first three-dimensional model 10 and second images 32 of the second three-dimensional model 20. The difference determining unit 103 further determines visually relevant differences 33 between the first images 31 and the second images 32, thereby determining the visually relevant design differences between the first three-dimensional model 10 and the second three-dimensional model 20. Preferably, the difference determining unit 103 determines visually relevant design differences 100 between the first three-dimensional model 10 and the second three-dimensional model 20 only from the viewpoints 30. In other words, the difference determining unit 103 determines visually relevant design differences 100 between the first three-dimensional model 10 and the second three-dimensional model 20 from first images 31 and second images 32 only rendered from one or more of the viewpoints 30. The first three-dimensional model 10 is for example a three-dimensional reference model 11. The reference mesh generating engine 108 receives the three-dimensional reference model 11 from the model receiving unit 101, and the reference mesh generating engine 108 generates a reference mesh 80 for the three-dimensional reference model 11, wherein the reference mesh 80 comprises a reference number 81 of vertices and a reference position 82 of each of the vertices. The design modification receiving unit 105 receives one or more design modifications 40 wherein each of the design modifications 40 may be applied on the three-dimensional reference model 11. The visually relevant design differences 100 result from the design modifications 40. For example, the one or more design modifications 40 are inputted in the system 1. According to an alternative embodiment, the one or more design modifications 40 may be retrieved from for example a database of the system 1. Each of the design modifications 40 corresponds to a modification of the reference number 81 of vertices of the reference mesh 80 and/or to a modification of the reference position 82 of each of the vertices of the reference mesh 80. Each of the design modifications 40 comprises a modification number 83 of vertices and a modified position 84 of each of the vertices. The design modifications 40 are for example predetermined for a three-dimensional model 10;11;20. The modifying unit 106 applies one or more of the design modifications 40 on the three-dimensional reference model 11, thereby generating one or more three-dimensional models 12. For each of the design modifications 40, the modifying unit 106 generates three-dimensional models 12 for modified number 83 of vertices and with each modified position 84 of each of the vertices. For example, in FIG. 4, the design modification receiving unit 105 receives one design modification 40. The design modification 40 comprises 3 different modified numbers 83 of vertices for the three-dimensional reference model 11, and the design modification 40 further comprises 3 different sets of modified positions 84 for each of the vertices. The modifying unit 106 therefore generates three-dimensional modified models 12 for each modified number 83 and modified positions 84 for the three-dimensional reference model 11. The second three-dimensional model 20 corresponds to one of the three-dimensional modified models 12 and the difference determining unit 103 determines visually relevant design differences between the first three-dimensional model 10, i.e. the three-dimensional reference model 11, and each of the second three-dimensional model 20, wherein the second three-dimensional model 20 each time corresponds to one or the 3 three-dimensional modified models 12 generated by the modifying unit 106. More particularly, the rendering engine 104 receives the three-dimensional reference model 11 and receives one of the 3 three-dimensional modified models 12 and the rendering engine 104 renders first images 31 of the three-dimensional reference model 11 for one or more of the viewpoints 30 and second images 32 of one of the 3 three-dimensional modified models 12 for one or more of the viewpoints 30. The difference determining unit 33 receives the first images 31 and the second images 32 from the rendering engine 104 and the difference determining unit 33 determines visually relevant differences 33 between the first images 31 of the three-dimensional reference model 11 for one or more of the viewpoints 30 and second images 32 of one of the 3 three-dimensional modified models 12 for one or more of the viewpoints 30. The rendering engine 104 then receives the three-dimensional reference model 11 and receives another one of the 3 three-dimensional modified models 12 and the rendering engine 104 renders first images 31 of the three-dimensional reference model 11 for one or more of the viewpoints 30 and second images 32 of another one of the 3 three-dimensional modified models 12 for one or more of the viewpoints 30. The difference determining unit 33 receives the first images 31 and the second images 32 from the rendering engine 104 and the difference determining unit 33 determines visually relevant differences 33 between the first images 31 of the three-dimensional reference model 11 for one or more of the viewpoints 30 and second images 32 of another one of the 3 three-dimensional modified models 12 for one or more of the viewpoints 30. The operation is repeated for all the three-dimensional modified models 12 generated by the modifying unit 106.

Figure 5:
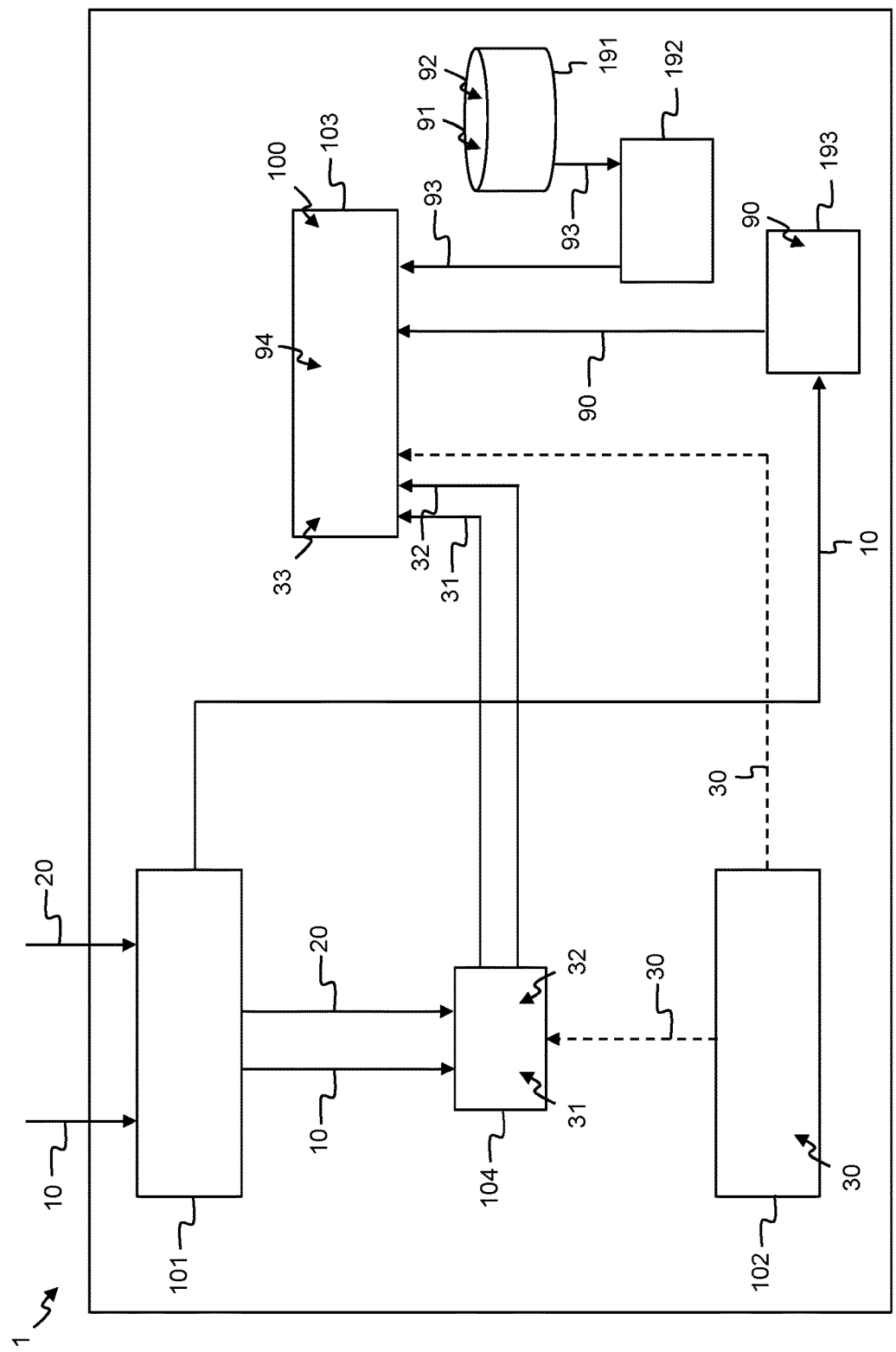
FIG. 5 schematically illustrates an embodiment of a system according the present invention wherein said system determines visually relevant design features of a three-dimensional model.

According to an embodiment shown in FIG. 5, a system 1 is for determining visually relevant design differences 100 between a first three-dimensional model 10 and a second three-dimensional model 20 is depicted. The system 1 comprises a model receiving unit 101, a viewpoint defining unit 102, a difference determining unit 103, a rendering engine 104, a model library 191, a relevance learning unit 192 and a design feature determining unit 193. The model receiving unit 101 receives a first three-dimensional model 10 and a second three-dimensional model 20. The viewpoint defining unit 102 defines one or more viewpoints 30 from which the first three-dimensional model 10 and the second three-dimensional model 20 can be viewed. The difference determining unit 103 determines visually relevant design differences 100 between the first three-dimensional model 10 and the second three-dimensional model 20 from the one or more viewpoints 30. The rendering engine 104 renders, from each of the one or more viewpoints 30, first images 31 of the first three-dimensional model 10 and second images 32 of the second three-dimensional model 20. The difference determining unit 103 further determines visually relevant differences 33 between the first images 31 and the second images 32, thereby determining the visually relevant design differences between the first three-dimensional model 10 and the second three-dimensional model 20. Preferably, the difference determining unit 103 determines visually relevant design differences 100 between the first three-dimensional model 10 and the second three-dimensional model 20 only from the viewpoints 30. In other words, the difference determining unit 103 determines visually relevant design differences 100 between the first three-dimensional model 10 and the second three-dimensional model 20 from first images 31 and second images 32 only rendered from one or more of the viewpoints 30. The model library 191 comprises a plurality of three-dimensional models 91, wherein each of the three-dimensional models 91 comprises one or more learning features 92. The relevance learning unit 192 receives from the model library 191, one or more relevance criteria 93 for the learning design features 92 of the three-dimensional models 91 of the model library 191. The design feature determining unit 193 receives the first three-dimensional model 10 and determines, based on the fully trained relevance learning unit 192, the design features 90 of the first three-dimensional model 10. The difference determining unit 103 receives the design features 90 of the first three-dimensional model 10 and the one or more relevance criteria 93 for the learning design features 92 of the three-dimensional models 91 of the model library 191. The difference determining unit 103 further determines that the design features 90 of the first three-dimensional model 10 are visually relevant design features 94 of the first three-dimensional model 10 when the design features 90 correspond to one or more relevance criteria 93.

Figure 6:
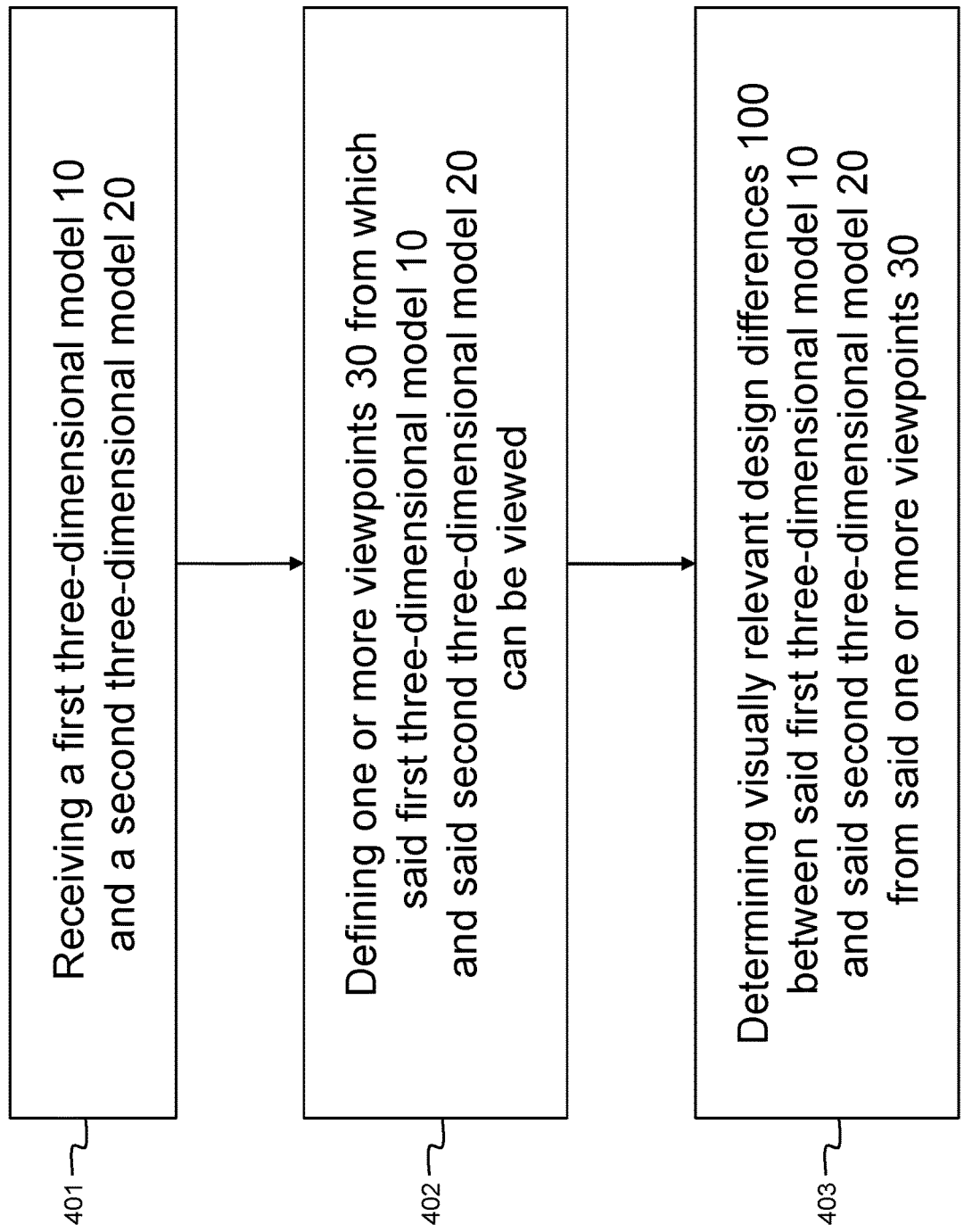
FIG. 6 schematically illustrates an embodiment of the steps of a method according to the present invention.

FIG. 6 schematically illustrates an embodiment of the steps of the method according to the present invention. In step 401, a first three-dimensional model 10 and a second three-dimensional model 20 are received. Then, in step 402, one or more viewpoints 30 from which said first three-dimensional model 10 and a second three-dimensional model 20 can be viewed are defined. Finally, in step 403, visually relevant design differences 100 between the first three-dimensional model 10 and the second three-dimensional model 20 from said one or more viewpoints 30 are determined.

Figure 7:
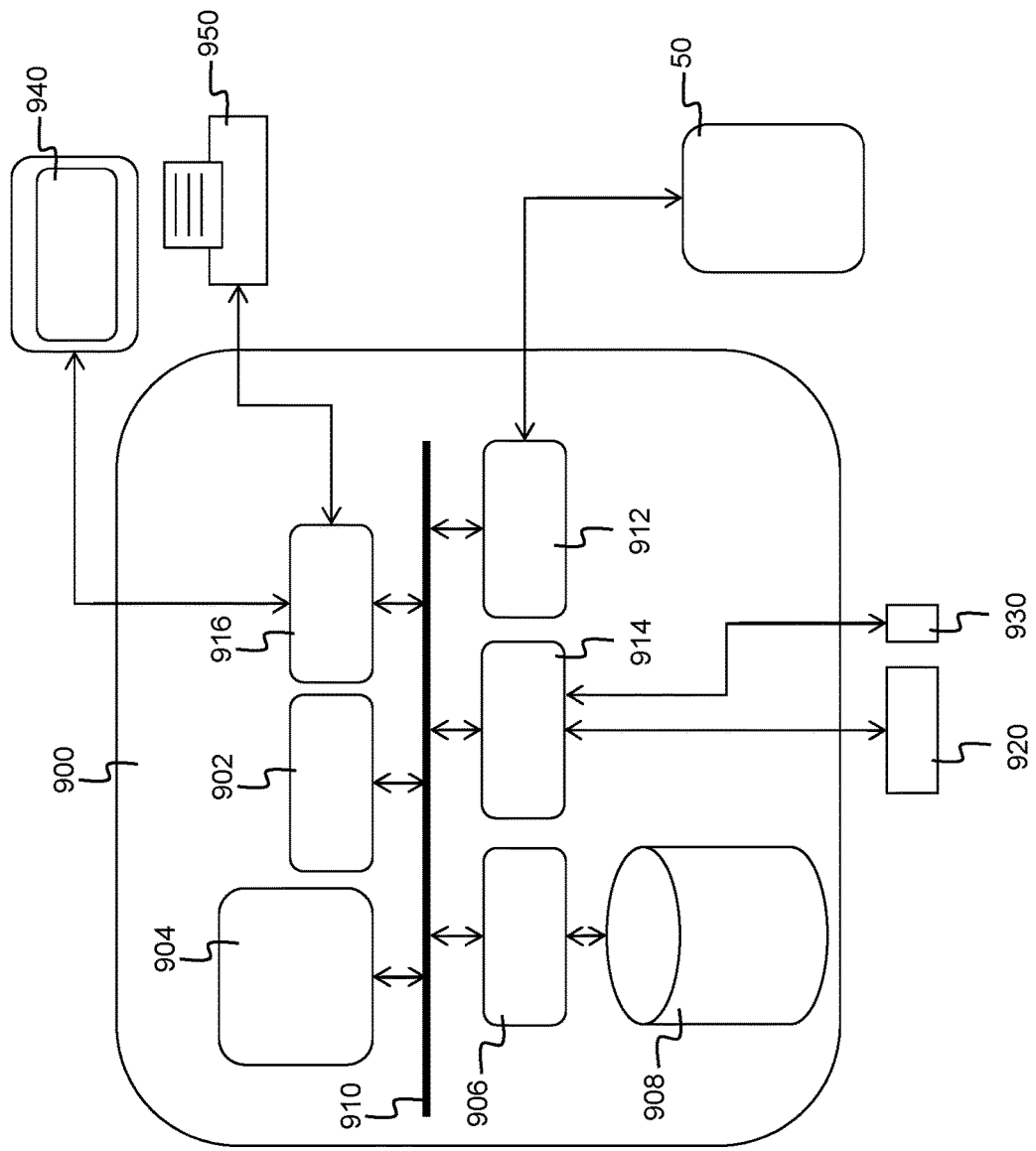
FIG. 7 schematically illustrates a suitable computing system for hosting the system of FIG. 1.

FIG. 7 shows a suitable computing system 800 for hosting the system 1 of FIG. 1. Computing system 900 may in general be formed as a suitable general purpose computer and comprise a bus 910, a processor 902, a local memory 904, one or more optional input interfaces 914, one or more optional output interfaces 916 a communication interface 912, a storage element interface 906 and one or more storage elements 908. Bus 910 may comprise one or more conductors that permit communication among the components of the computing system. Processor 902 may include any type of conventional processor or microprocessor that interprets and executes programming instructions. Local memory 904 may include a random access memory (RAM) or another type of dynamic storage device that stores information and instructions for execution by processor 902 and/or a read only memory (ROM) or another type of static storage device that stores static information and instructions for use by processor 904. Input interface 914 may comprise one or more conventional mechanisms that permit an operator to input information to the computing device 900, such as a keyboard 920, a mouse 930, a pen, voice recognition and/or biometric mechanisms, etc. Output interface 916 may comprise one or more conventional mechanisms that output information to the operator, such as a display 940, a printer 950, a speaker, etc. Communication interface 912 may comprise any transceiver-like mechanism such as for example two 1 Gb Ethernet interfaces that enables computing system 900 to communicate with other devices and/or systems, for example mechanisms for communicating with one or more other computing systems 50. The communication interface 912 of computing system 900 may be connected to such another computing system by means of a local area network (LAN) or a wide area network (WAN, such as for example the internet, in which case the other computing system 980 may for example comprise a suitable web server. Storage element interface 906 may comprise a storage interface such as for example a Serial Advanced Technology Attachment (SATA) interface or a Small Computer System Interface (SCSI) for connecting bus 910 to one or more storage elements 908, such as one or more local disks, for example 1 TB SATA disk drives, and control the reading and writing of data to and/or from these storage elements 908. Although the storage elements 908 above is described as a local disk, in general any other suitable computer-readable media such as a removable magnetic disk, optical storage media such as a CD or DVD, -ROM disk, solid state drives, flash memory cards, . . . could be used. The system 900 described above can also run as a Virtual Machine above the physical hardware.

The system 1 of FIG. 1 can be implemented as programming instructions stored in local memory 904 of the computing system 900 for execution by its processor 902. Alternatively, system 1 of FIG. 1 could be stored on the storage element 908 or be accessible from another computing system 50 through the communication interface 912.

Figure 8:
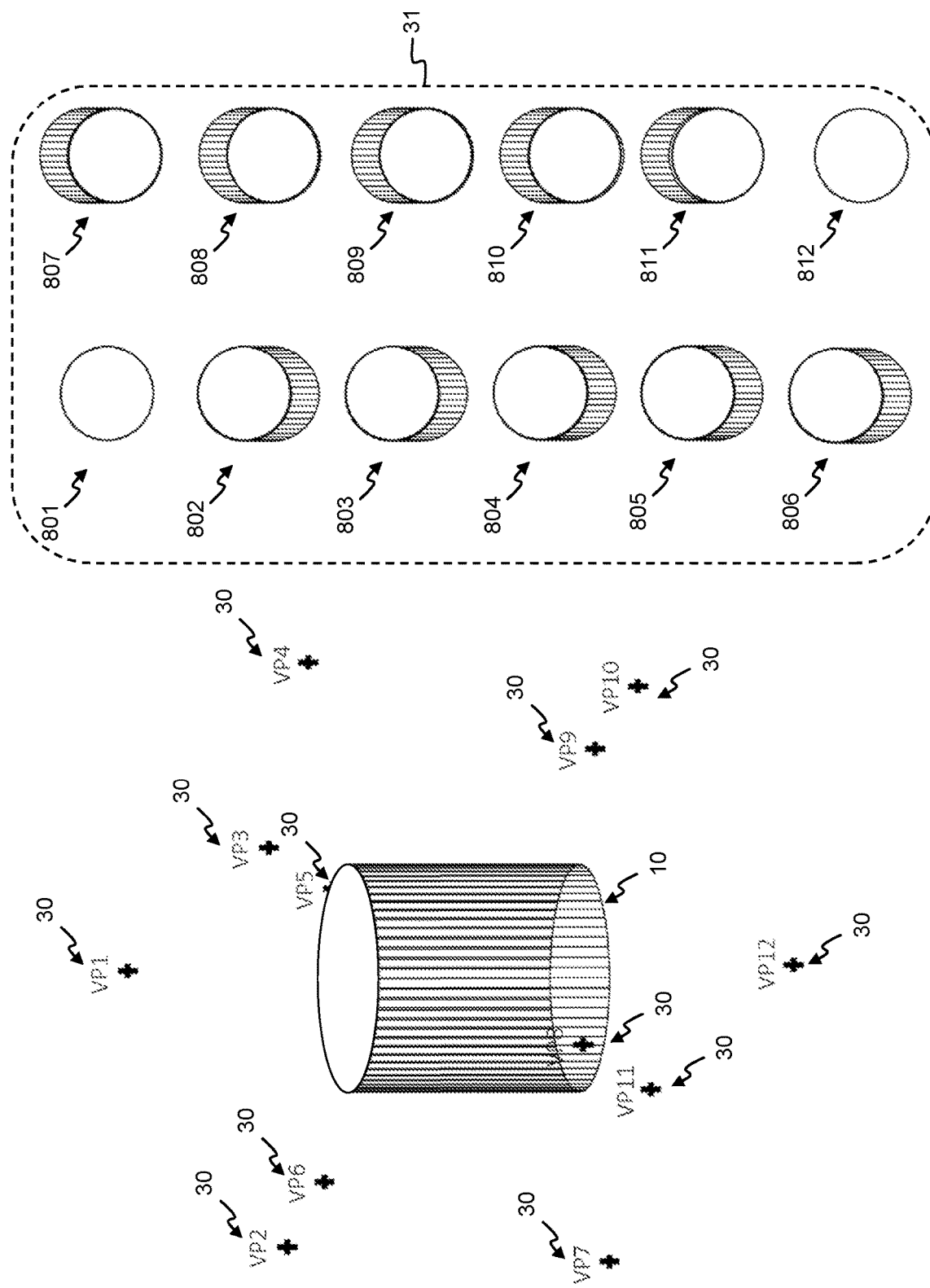
FIG. 8 schematically illustrates a first three-dimensional model and first images rendered from the viewpoints visible on FIG. 8.

According to an embodiment shown in FIG. 8, a first three-dimensional model 10 is received in a three-dimensional analysis environment. The system according to the present invention as depicted in any of FIG. 1 to FIG. 5 defines twelve viewpoints 30 respectively labelled VP1 to VP12, thereby defining regions of interest in the first three-dimensional model 10 visible from the viewpoints 30. FIG. 8 further schematically illustrates first images 31 of the first three-dimensional model 10 labelled 801 to 812, wherein each first image 31 is rendered from one of the viewpoints 30.

According to an embodiment shown in FIG. 9, a second three-dimensional model 20 is received in a three-dimensional analysis environment. The system according to the present invention as depicted in any of FIG. 2 to FIG. 5 defines twelve viewpoints 30 respectively labelled VP1 to VP12, wherein the viewpoints 30 of FIG. 9 are identical to the viewpoints 30 of FIG. 8, thereby defining regions of interest in the second three-dimensional model 20 visible from the viewpoints 30. FIG. 9 further schematically illustrates second images 32 of the second three-dimensional model 20 labelled 901 to 912, wherein each second image 32 is rendered from one of the viewpoints 30.

The first three-dimensional model 10 and the second three-dimensional model 20 are compared with each other. An allowable design difference is predetermined in a system according to the present invention as depicted in any of FIG. 2 to FIG. 5 for the first three-dimensional model 10 and the three-dimensional model 20. The first images 31 of the first three-dimensional model 10 rendered from the viewpoints 30 labelled VP1 to VP6 and labelled 801;802;803;804;805; 806 are identical to the second images 32 of the second three-dimensional model 20 rendered from the viewpoints 30 labelled VP1 to VP6 and labelled 901;902;903;904;905; 906. When determining visually relevant design differences between the first three-dimensional model 10 of FIG. 8 and the second three-dimensional model 20 of FIG. 9, the system according to the present invention as depicted in any of FIG. 2 to FIG. 5 would measure a distance between the first three-dimensional model 10 and the second three-dimensional model null. In other words, the system according to the present invention as depicted in any of FIG. 2 to FIG. 5 would not determine any visually relevant design difference between the first three-dimensional model 10 and the second three-dimensional model 20. However, the first images 31 of the first three-dimensional model 10 rendered from the viewpoints 30 labelled VP7 to VP12 and labelled 807;808; 809;810;811;812 differ from the second images 32 of the second three-dimensional model 20 rendered from the viewpoints 30 labelled VP7 to VP12 and labelled 907;908;909; 910;911;912. When determining visually relevant design differences between the first three-dimensional model 10 of FIG. 8 and the second three-dimensional model 20 of FIG. 9, the system according to the present invention as depicted in any of FIG. 2 to FIG. 5 would measure a distance between the first three-dimensional model 10 and the second three-dimensional model 20. The system would than determine a distance between the first three-dimensional model 10 and the second three-dimensional model 20 by superimposing the first images 31 and the second images 32 rendered only from the viewpoints 30 labelled VP7 to VP12. The system would further determine a surface area over which the distance between the first three-dimensional model 10 and the second three-dimensional model 20 is null. For each region of interest, the system further combines the distances from all the viewpoints 30 labelled VP7 to VP12, thereby generating for each region of interest an accumulated distance between the first three-dimensional model 10 and the second three-dimensional model 20. The system then weighs the accumulated distance by the surface area, thereby generating a measured design difference. The system according to the present invention as depicted in any of FIG. 2 to FIG. 5 then determines visually relevant design difference between the first three-dimensional model 10 and the second three-dimensional model 20 when the measured design difference exceeds a predetermined allowable design difference.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system for determining visually relevant design differences between a first three-dimensional model and a second three-dimensional model,
wherein said system comprises:
a model receiving unit configured to receive said first three-dimensional model and said second three-dimensional model;
a viewpoint defining unit configured to define one or more viewpoints from which one or more regions of interest of said first three-dimensional model and of said second three-dimensional model can be viewed; and
a difference determining unit configured to determine visually relevant design differences between said first three-dimensional model and said second three-dimensional model from said one or more viewpoints and only in said regions of interest;
wherein said viewpoint defining unit is further configured to define:
said one or more regions of interest visible from said one or more viewpoints in said first three-dimensional model and in said second three-dimensional model; and
an allowable design difference between said first three-dimensional model and said second three-dimensional model for each of said regions of interest;
wherein said difference determining unit is further configured to:

determine over each of said regions of interest and only from said one or more viewpoints, a distance between said first three-dimensional model and said second three-dimensional model;

determine a surface area for each of said regions of interest over which said distance between said first three-dimensional model and said second three-dimensional model is null; and for each of said regions of interest:
combine said distances from said viewpoints, thereby generating for each region of interest an accumulated distance between said first three-dimensional model and said second three-dimensional model;

weigh said accumulated distance by said surface area, thereby generating a measured design difference; and determine said visually relevant design differences between said first three-dimensional model and said second three-dimensional model from said one or more viewpoints when said measured design difference exceeds said allowable design difference.

2. The system according to claim 1, wherein said system further comprises a rendering engine configured to render, from each of said one or more viewpoints, first images of said first three-dimensional model and second images of said second three-dimensional model.

3. The system according to claim 2, wherein said difference determining unit is further configured to determine visually relevant design differences between said first three-dimensional model and said second three-dimensional model from said first images and said second images rendered only from said one or more viewpoints, thereby determining said visually relevant design differences between said first three-dimensional model and said second three-dimensional model.

4. The system according to claim 3, wherein said difference determining unit is further configured to superimpose said first images and said second images and to determine, when superimposing said first images and said second images, a distance between said first three-dimensional model and said second three-dimensional model.

5. The system according to claim 1, wherein said first three-dimensional model is a three-dimensional reference model and wherein said system further comprises:
a design modification receiving unit configured to receive a set of design modifications,
wherein each of said design modifications may be applied on said three-dimensional reference model; and
a modifying unit configured to apply one or more of said design modifications on said three-dimensional reference model, thereby generating three-dimensional modified models, each comprising design differences with respect to said three-dimensional reference model;
wherein said design differences result from said design modifications.

6. The system according to claim 5, wherein said second three-dimensional model corresponds to one of said three-dimensional modified models.

7. The system according to claim 5, wherein said three-dimensional reference model is a parametric three-dimensional model and wherein said system further comprises a reference model generating engine configured to generate said three-dimensional reference model from design parameters and wherein each of said design modifications corresponds to a modification of a design parameter of said three-dimensional reference model; and wherein each of said design modifications comprises:
a modification range of design parameter values along which said design parameter may be modified;
a modification step size according to which said design parameter may be modified in said modification range of design parameters values.

8. The system according to claim 7, wherein, for each of said design modifications, said modifying unit is configured to generate three-dimensional modified models for each design parameter value along said modification range and with said modification step size of each of said design parameter.

9. The system according to claim 5, wherein said three-dimensional reference model is represented by a mesh representation,
wherein said mesh representation comprises a reference number of vertices and a reference position of each of said vertices.

10. The system according to claim 9, wherein each of said design modifications corresponds to a modification of said reference number of vertices and/or of said reference position of each of said vertices of said three-dimensional reference model, and
wherein each of said design modifications comprises:
a modified number of vertices; and/or
a modified position of each of said vertices.

11. The system according to claim 10, wherein, for each of said design modification, said modifying unit is configured to generate three-dimensional modified meshes for said three-dimensional modified models,
wherein said three-dimensional modified meshes comprise said modified number of vertices and with said modified positions of each of said vertices.

12. The system according to claim 1, wherein said difference determining unit comprises a multi-view recurrent neural network which comprises a convolution neural network in each timestep of said recurrent neural network.

13. The system according to claim 7, wherein said parametric three-dimensional model comprises design parameters, and
wherein said system further comprises:
a model library comprising a plurality of parametric three-dimensional models,
wherein each of said parametric three-dimensional models comprises one or more learning design parameters;
a relevance learning unit configured to receive, from said model library, one or more relevance criteria for said learning design parameters of said three-dimensional models; and
wherein said difference determining unit is further configured to determine that said design parameters of said first three-dimensional model are visually relevant design parameters of said parametric three-dimensional model when said design parameters correspond to one or more relevance criteria.

14. A computer-implemented method for determining visually relevant design differences between a first three-dimensional model and a second three-dimensional model, wherein said method comprises the steps of:
receiving said first three-dimensional model and said second three-dimensional model;

defining one or more viewpoints from which one or more regions of interest of said first three-dimensional model and of said second three-dimensional model can be viewed;

determining visually relevant design differences between said first three-dimensional model and said second three-dimensional model from said one or more viewpoints and only in said regions of interest;

defining a three-dimensional analysis environment, wherein said three-dimensional analysis environment comprises:

said one or more viewpoints from which said first three-dimensional model and said second three-dimensional model can be viewed, thereby defining one or more regions of interest visible from said one or more viewpoints in said first three-dimensional model and in said second three-dimensional model;

an allowable design difference between said first three-dimensional model and said second three-dimensional model for each of said regions of interest; and an allowable design difference between said first three-dimensional model and said second three-dimensional model for each of said regions of interest;

aligning said first three-dimensional model and said second three-dimensional model in said three-dimensional analysis environment;

determining, over each of said regions of interest and only from said one or more viewpoints, a distance between said first three-dimensional model and said second three-dimensional model;

determining a surface area for each of said regions of interest over which said distance between said first three-dimensional model and said second three-dimensional model is null; and for each of said regions of interest:

combining said distances from said viewpoints, thereby generating for each region of interest an accumulated distance between said first three-dimensional model and said second three-dimensional model;

weighing said accumulated distance by said surface area, thereby generating a measured design difference; and determining said visually relevant design differences between said first three-dimensional model and said second three-dimensional model from said one or more viewpoints when said measured design difference exceeds said allowable design difference.

15. A computer readable storage medium comprising computer-executable instructions which, when executed by a computing system, perform a method according to claim 14.

* * * * *

UNITED STATES PATENT AND TRADEMARK OFFICE
CERTIFICATE OF CORRECTION

| | | |
|---|---|---|
| PATENT NO. | : 11,436,789 B2 | Page 1 of 1 |
| APPLICATION NO. | : 17/291501 | |
| DATED | : September 6, 2022 | |
| INVENTOR(S) | : Martijn Joris and Olivier De Deken | |

It is certified that error appears in the above-identified patent and that said Letters Patent is hereby corrected as shown below:

On the Title Page

Item (30):
Change:
"Nov. 5. 2018 (EP)................................ 8204299"
To:
-- Nov. 5, 2018 (EP)...............................18204299 --

Signed and Sealed this
Twenty-seventh Day of August, 2024

Katherine Kelly Vidal
*Director of the United States Patent and Trademark Office*